United States Patent [19]

Bapat

[11] Patent Number: 5,317,742
[45] Date of Patent: May 31, 1994

[54] DYNAMIC TRANSLATION OF NETWORK MANAGEMENT PRIMITIVES TO QUERIES TO A DATABASE

[75] Inventor: Subodh Bapat, Fort Lauderdale, Fla.
[73] Assignee: Racal-Datacom, Inc., Sunrise, Fla.
[21] Appl. No.: 719,214
[22] Filed: Jun. 21, 1991
[51] Int. Cl.⁵ .................................................. G06F 15/38
[52] U.S. Cl. ...................... 395/700; 364/261; 364/261.1; 364/240.8; 364/DIG. 1
[58] Field of Search ........................................... 395/700

[56] References Cited

U.S. PATENT DOCUMENTS

| | | | |
|---|---|---|---|
| 4,791,587 | 12/1988 | Doi | 364/900 |
| 4,870,610 | 9/1989 | Belfer | 364/900 |
| 5,129,086 | 7/1992 | Coyle, Jr. et al. | 395/650 |
| 5,197,005 | 3/1993 | Schwartz et al. | 364/419 |

Primary Examiner—Gareth D. Shaw
Assistant Examiner—Jonathan H. Backenstose
Attorney, Agent, or Firm—William A. Newton

[57] ABSTRACT

A technique for dynamically translating network management primitives into operations on management information stored within a relational database hosting a management information base. A CMIP network management operation and argument is retrieved from a network management processing machine and processed by a full or partial OSI stack. The CMIP operation is examined to ascertain a type of network management operation. If the operation is of a type which interacts with the database, a database query is generated in accordance with the operation type, to perform the network management operation on the relational database.

15 Claims, 23 Drawing Sheets

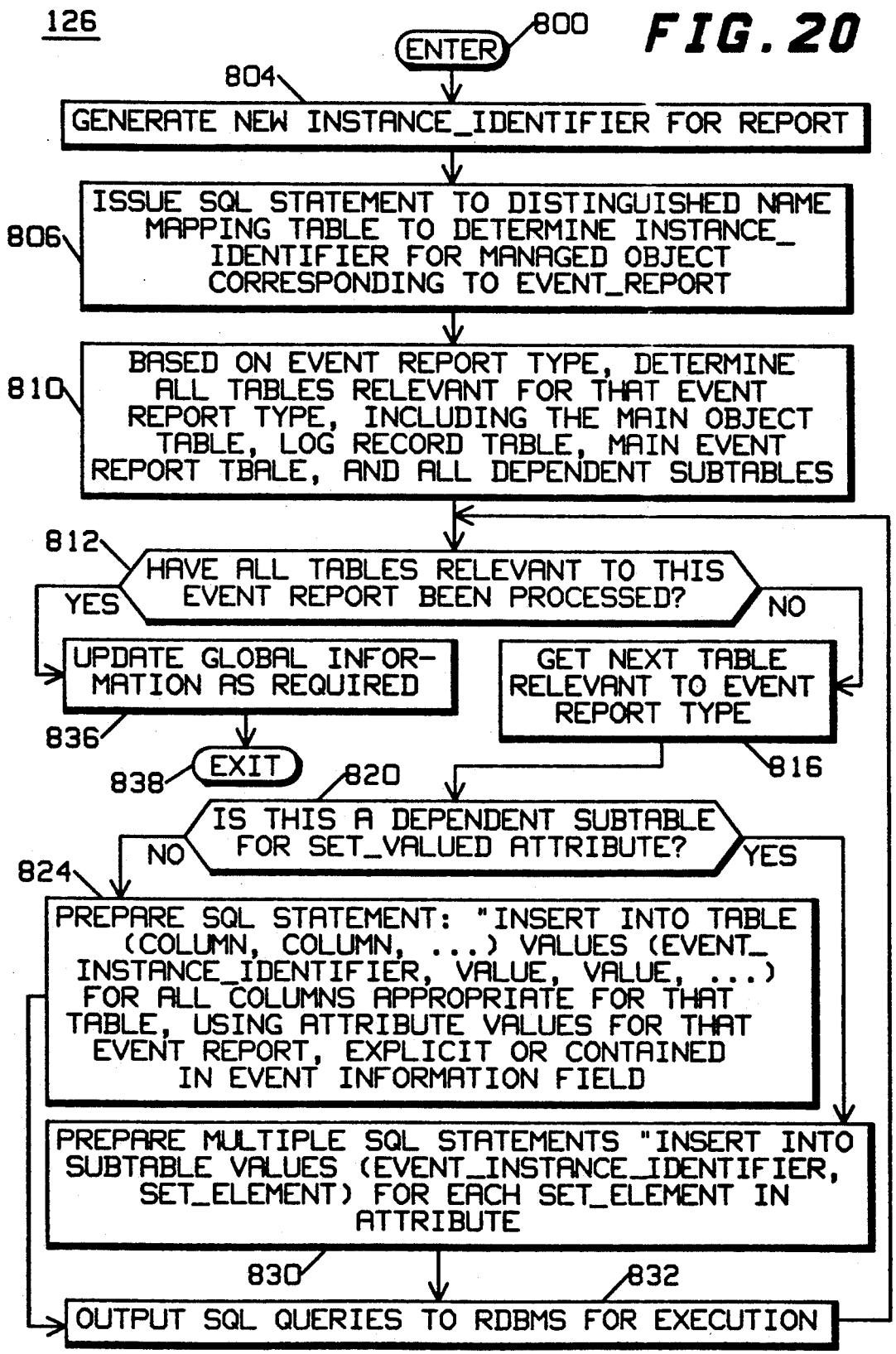

DYNAMIC TRANSLATION OF NETWORK MANAGEMENT PRIMITIVES TO QUERIES TO A DATABASE

CROSS REFERENCE TO RELATED DOCUMENTS

This application is related to U.S. patent applications Ser. No. 07/628,258 and 07/628,120 both filed Dec. 14, 1990 to Subodh Bapat, entitled "Automatic Storage of Persistent Objects in a Relational Schema" and "Automatic Storage of Persistent ASN.1 Objects in a Relational Schema" respectively. Both of these applications are incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

1. Field of the Invention

This invention relates to a technique for dynamically translating network management primitives into operations on management information stored within a Management Information Base (MIB). More particularly, the present invention is concerned with that subset of network management systems in which the Management Information Base is implemented as a Relational Database.

2. Background of the Invention

Communications networks, such as data communications networks, use network management systems to control and monitor the performance of devices attached to the network. Many such current network management systems use relational databases for persistent storage of various information relating to the network and devices therein. Recently, various standards bodies have proposed a protocol called Common Management Information Protocol (CMIP) designed to carry information about the specific managed objects in the network and about operations to be executed upon them.

Unfortunately, this CMIP protocol does not provide for persistent storage of information. Nor does it provide a mechanism for interfacing with current techniques using Relational Database Management Systems (RDBMS).

The present invention addresses this problem by providing a method and apparatus for translating between CMIP and RDBMS using standard Structured Query Language (SQL) queries.

SUMMARY OF THE INVENTION

It is an object of the present invention to provide a method and apparatus for translating network management primitives into operations on management information stored within a MIB.

It is a feature that the present invention to provide an interface between an MIB and CMIP using SQL queries.

It is an advantage of the present invention that these SQL queries can be executed against Network Management Information which is persistently stored in a Relational Database Management System (RDBMS), which may be local, remote, centralized or distributed.

It is a further advantage of the present invention that it may be implemented as resident software in computer memory, thereby providing a dynamic mechanism to perform the translation without human intervention.

These and other objects, advantages and features of the invention will become apparent to those skilled in the art upon consideration of the following description of the invention.

According to one aspect of the present invention, a method for translating network management operations using a digital computer, includes the steps of retrieving a network management operation and argument from a network management processing machine; ascertaining a type of the network management operation; and generating a database query in accordance with the type, to perform the network management operation on a database.

In another aspect of the present invention, a method for translating Common Management Information Protocol (CMIP) network management operations using a digital computer includes the steps of: retrieving a CMIP network management operation and argument from a network management processing machine; ascertaining a type of the network management operation; and if the type is one of m-Create, m-Delete, m-Set, m-Get and m-Event Report Common Management Information Protocol (CMIP) operations, generating a Structured Query Language (SQL) database query in accordance with the type, to perform the network management operation on a relational database.

According to another aspect of the invention, an apparatus for translating a network management operation into a database query includes a database containing information relevant to the network management operation. An interface receives the network management operation. A decoder decodes the network management operation. An analysis function analyzes the decoded network management operation to determine if the decoded network management operation requires interaction with the database. A translator converts the decoded and analyzed network management operation into a database query.

Another apparatus for translating a Common Management Information Protocol (CMIP) network management operation into a database query includes a relational database containing information relevant to the network management operation, the relational database being compatible with Structured Query Language (SQL) queries. An Open System Interconnection (OSI) interface receives the CMIP network management operation. An OSI protocol stack decodes the network management operation. A CMIP protocol machine analyzes the decoded network management operation to determine if the decoded network management operation requires interaction with the database. A translator converts the decoded and analyzed network management operation into a SQL database query.

A technique is provided for dynamically translating network management primitives into operations on management information stored within a relational database hosting a management information base. A CMIP network management operation and argument is retrieved from a network management processing machine and processed by a full or partial OSI stack. The CMIP operation is examined to ascertain a type of network management operation. If the operation is of a type which interacts with the database, a database query is generated in accordance with the operation type, to perform the network management operation on the relational database.

The features of the invention believed to be novel are set forth with particularity in the appended claims. The invention itself however, both as to organization and method of operation, together with further objects and advantages thereof, may be best understood by reference to the following description taken in conjunction with the accompanying drawings.

BRIEF DESCRIPTION OF THE DRAWING

FIG. 20 is a flow chart of the m-EventReport handler process in the present invention.

DETAILED DESCRIPTION OF THE INVENTION

Before proceeding with a discussion of the invention itself, it may be helpful to provide a brief discussion of the physical environment associated with the preferred embodiment, that is a data communication network. Such a communication network may be made up of many logical devices (e.g. software objects) as well as physical devices such as modems, digital service units (DSU's), terminals, computers, switches, cross-connects, bridges, routers, multiplexers and such communication devices and equipment coupled together via wireless or wire-line media, for example, telephone lines, fiber optic channels, satellite links, etc. A typical example of such a network is an airline reservation system where numerous terminals (at airports, travel agencies, airline reservation offices, etc.) communicate with a central computer to access reservation information, flight schedules, seat assignments, etc. In such networks, there is generally a network management function which is used to monitor the network and determine the cause of any malfunction. This network management function is carried out by specialized combinations of hardware and software which may be local, remote, centralized or distributed to control the network. In these environments, it is often critical to operation of the business to have the system fully operational nearly 100% of the time. Network management functions are used to quickly isolate problems and possibly reroute data traffic to circumvent problems.

As part of the data communication network management system, one or more databases containing various attributes of all physical and logical objects (e.g. modems, DSU'S, multiplexers, etc.) is usually maintained to facilitate the above functions. The database(s) may be local, remote, centralized or distributed without departing from the present invention. In order to effect robust and useful network management functions, it is desirable to be able to provide persistent storage of the attributes of these objects managed by the network management system. With this background on the physical characteristics of the environment used for the examples, we can proceed with a discussion of the invention itself.

Figure 1:
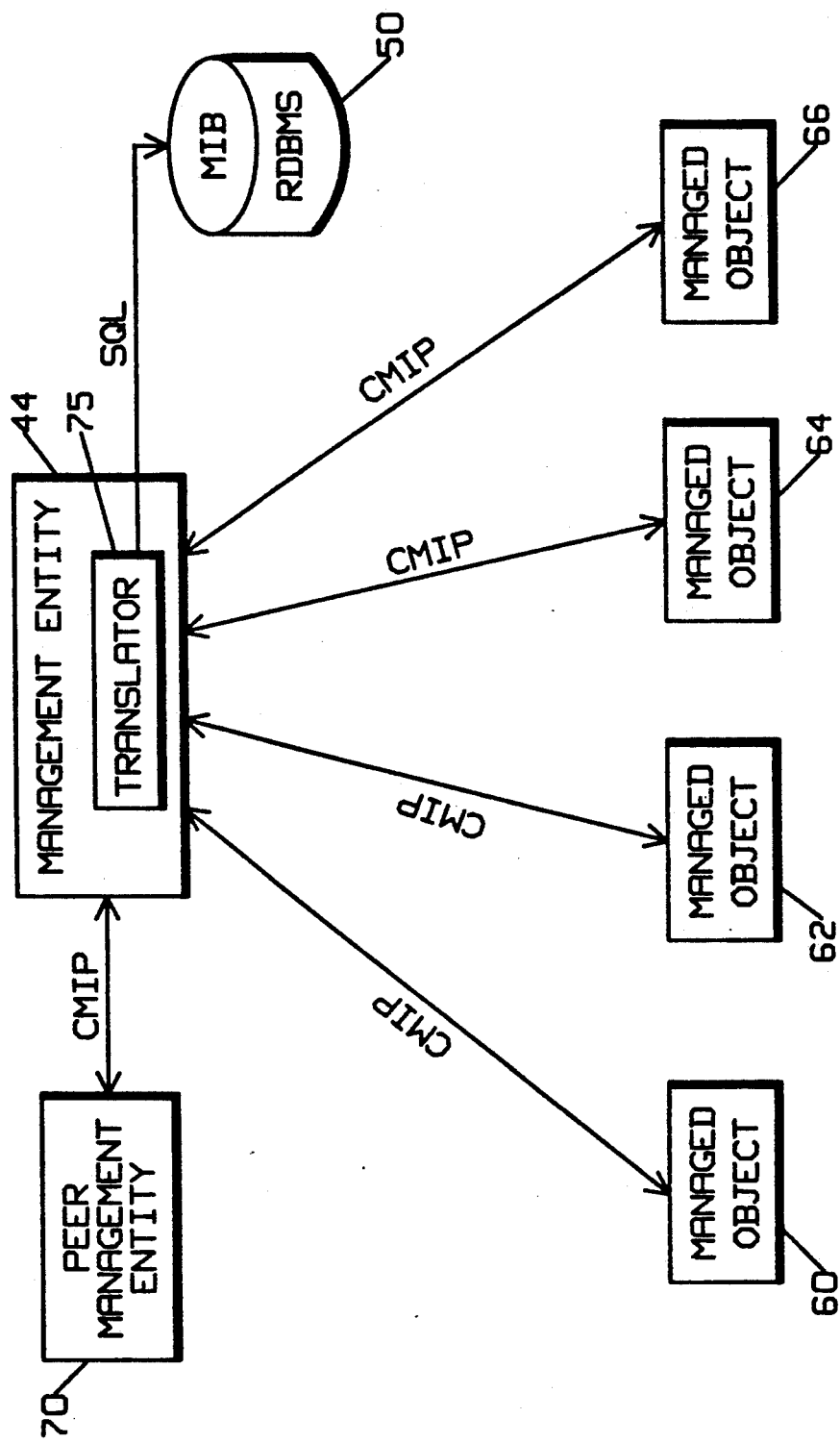
FIG. 1 is a high level diagram showing the role of the translator of the present invention within a network management system.

Referring to FIG. 1, a network management system, e.g. network management entity 44, stores information in a Management Information Base (MIB) 50. MIB 50 is a mechanism which allows the persistent storage of information which a network management system 44 needs in order to operate. Examples of such information include a directory of all the elements in the network, the topology of the network, characteristics of individual network elements, characteristics of connection links, a history of alarms received by the network management system 44, performance and trend statistics, accounting information—in general, any information which is of interest in the operation of the network.

OSI[1] Management standards define an abstract model for the format of such information. These standards do not define an implementation, that is, the specific format in which the information is internally stored within the network management system. It is sufficient for an OSI-compliant network management system to present such information at its interface in a manner that adheres to the standard structure for the information, irrespective of how it is stored internally.

[1] OSI (Open System Interconnection) is a family of communications standards defined by the ISO (International Standards Organization). The Network Management Standards are part of the OSI standards.

The CCITT[2] standard for the *Structure Of Management Information* (CCITT X.720, X.721, X.722) is typically defined using a formal object-oriented notation, such as templates defined in ASN.1 macro notation. Specific templates are used to create a *Definition of Management Information* (DMI, ref. CCITT X.721), which defines the specific object classes and inheritance relationships between them, in order to model the communications network. In a network management system, the DMI is used as the basis for the definition of the schema for the Management Information Base. Individual network elements are then stored as object instances within the schema of a Management Information Base.
[2]International Consultive Committee on Telegraphy and Telephony The present invention is concerned with that subset of network management systems in which the Management Information Base 50 is implemented as a Relational Database (also referred to as 50). A Relational Database is a persistent data store in which all data are modeled as relations, or tabular data structures. Relational databases are popular mechanisms for persistent data storage as they have proven to be a stable and mature technology in the last several years. Relational databases are typically accessed using a data manipulation language or query language such as SQL (Structured Query Language). For purposes of this document, the term "query" is used in the accepted manner in the art to represent a language construct which interacts with a database without regard for whether or not an actual interrogatory is being issued to the database.

A network management system also needs to communicate with external entities as it operates. During the normal operation of a network management system, management operations are carried out by the management system by exchanging messages with managed objects, such as 60, 62, 64 and 66, or with other network management systems 70. These messages are conveyed using a Network Management Protocol. Under the OSI and CCITT Network Management frameworks, this protocol is the *Common Management Information Protocol*, or CMIP (CCITT X.710, X.711). This protocol is designed to convey information about specific managed objects, and about operations that need to be executed on them.

Often, network management systems execute management operations by performing appropriate operations on information stored within the Management Information Base 50. Many network management operations are queries requesting values of variables relevant to the operation of the network, or are requests to update or reconfigure some operating parameters of the network. Most often, these variables and parameters are stored within the persistent store of a Management Information Base 50. Thus, execution of management operations often requires the manipulation of data stored within the MIB 50, by interfacing with it to execute certain database operations. If the MIB 50 is hosted on a Relational Database Management System (RDBMS) platform, this is typically done using a standard RDBMS access language such as SQL.

The present invention describes a method and apparatus by which the execution of network management operations by updating MIB 50 information may be essentially reduced to a protocol translation problem, in which a standard network management protocol, such as CMIP, may be translated using a standard database manipulation language, such as SQL. This protocol translation may be achieved using a software entity, termed the CMIP-to-SQL translator 75 or simply translator 75. Currently, there exists no automatic mechanism to translate a CMIP request into an SQL request that can execute an appropriate action on the management information stored under an RDBMS platform. The invention described herein automatically translates such a CMIP request, received by a network management system, into an equivalent SQL request, which may be executed within the RDBMS in the network management system hosting the MIB 50 implementation.

To understand how this can be achieved, an understanding of both the SQL language and the CMIP protocol primitives is necessary. The SQL language is a standard database manipulation language and has been extensively described in commonly available literature (for example, ANSI Standard X3H2; C. J. Date, "An Introduction to Database Systems"; C. J. Date, "Guide to the SQL Standard"), and so will not be described here.

The following sections briefly describe the CMIP protocol, and the underlying service definition whence its services derive. The entire section which follows is referenced from Draft CCITT Recommendations X.710 (Common Management Information Service Definition) and X.711 (Common Management Information Protocol Specification).

COMMON MANAGEMENT INFORMATION SERVICES AND PROTOCOLS

The Service Definition on which CMIP is based defines the following kinds of service primitives as described in Table 1 below.

TABLE 1

| | |
|---|---|
| M-GET: | the service invoked to retrieve management information. |
| M-SET: | the service invoked to modify management information. |
| M-CREATE: | the service invoked to create an instance of a managed object. |
| M-DELETE: | the service invoked to delete an instance of a managed object. |
| M-ACTION: | the service invoked to perform an action on a managed object. |
| M-EVENT-REPORT: | the service invoked to report an event about a managed object. |
| M-CANCEL-GET: | the service invoked to request the cancellation of a previously requested and currently outstanding M-GET request |

Each one of these service primitives has a list of parameters associated with it, which will be examined in detail later. Further, each service may be requested in either confirmed or unconfirmed mode. The present invention is primarily focusing on M-GET, M-SET, M-CREATE, M-DELETE, and M-EVENT-REPORT, as they have the most immediate impact on data manipulation within the Management Information Base. Those skilled in the art may recognize other equivalent functions performed by other network management protocols.

CMIP Operations are based on the CMIS Primitives defined above. CMIP Operations are defined as ROS-based OSI Operations, and are defined using the OSI Remote Operations Service (ROS, CCITT Recommendations X.219 and X.229). Examples of these operations are defined below using ASN.1 macro notation as shown in the CCITT standards.

```
m-Create OPERATION
ARGUMENT                    CreateArgument
RESULT                      Create Result
ERRORS                      { --... list of possible errors which could
                              -- be returned }
::= localValue 8
m-Delete OPERATION
ARGUMENT                    DeleteArgument
RESULT                      Delete Result
ERRORS                      { --... list of possible errors which could
                              -- be returned }
LINKED                      { m-Linked-Reply }
::= localValue 9
m-Get OPERATION
ARGUMENT                    GetArgument
RESULT                      Get Result
ERRORS                      { --... list of possible errors which could
                              -- be returned }
LINKED                      { m-Linked-Reply }
::= localValue 3
m-Set OPERATION
ARGUMENT                    SetArgument
::= localValue 4
m-Set-Confirmed OPERATION
ARGUMENT                    SetArgument
RESULT                      Set Result
ERRORS                      { --... list of possible errors which could
                              -- be returned }
LINKED                      { m-Linked-Reply }
::= localValue 5
m-EventReport OPERATION
ARGUMENT                    EventReportArgument
::= localValue 0
m-EventReport-Confirmed OPERATION
ARGUMENT                    EventReportArgument
RESULT                      EventReportResults
ERRORS                      { --... list of possible errors which could
                              -- be returned }
::= localValue 1
```

The above definitions are examples of Remote Operations corresponding to the CMIS services on which the CMIP protocol definition is based. The syntax and details of the ROS notation above is not important for out purposes at this point, aside from the knowledge that each operation above is invoked with an argument which is specific to the type of operation (e.g. CreateArgument for the m-Create operation, SetArgument for the m-Set operation, etc). We will examine later the details of these arguments, and demonstrate the generation of equivalent requests in SQL.

Mapping CMIP Operations to SQL Data Manipulation Requests

The information against which the above operations are executed is stored in a MIB. That subset of management information which requires persistent storage is, for the purposes of this invention, assumed to be hosted on a relational database platform. The structure of the information to be stored in the MIB 50 is 10, defined in CCITT Recommendations X.720, "Management Information Model", X.721, "Definition of Management Information", and X.722, "Guidelines for the Definition of Managed Objects."

This Structure of Management Information (SMI) translates to a schema definition which is used to design the formats and templates for the data structures within the database, within which the actual information content will be stored. There are many ways of arriving at such a database schema definition based on the OSI SMI; one such mechanism is described in the above incorporated patent application. This mechanism is not important to the current invention, which focuses on the operations which are dynamically executed on this information once it has been defined and stored. We therefore assume that tables already exist in the schema of the RDBMS, whose structure has been defined according to some existing data modeling technique, such as Entity-Relationship modeling or Object-Oriented Modeling as defined in the above patent application.

Once such a schema has been defined, an almost one-to-one mapping may be achieved by translating CMIP operations into SQL data manipulation operations. The following Table 2 depicts how this mapping may be achieved in accordance with the present invention.

TABLE 2

| CMIP Operation | Purpose | SQL Equivalent |
| --- | --- | --- |
| m-Create | Inform management system of new object instance | INSERT INTO table_name ... |
| m-Delete | Delete object instance | DELETE FROM table_name WHERE ... |
| m-Get | Retrieve attribute value for specified object instance | SELECT FROM table_name WHERE ... |
| m-Set | Modify attribute value for specified object instance | UPDATE table_name SET ... |
| m-EventReport | Inform management system of interesting events | INSERT INTO table_name ... (conditional) |

Figure 2:
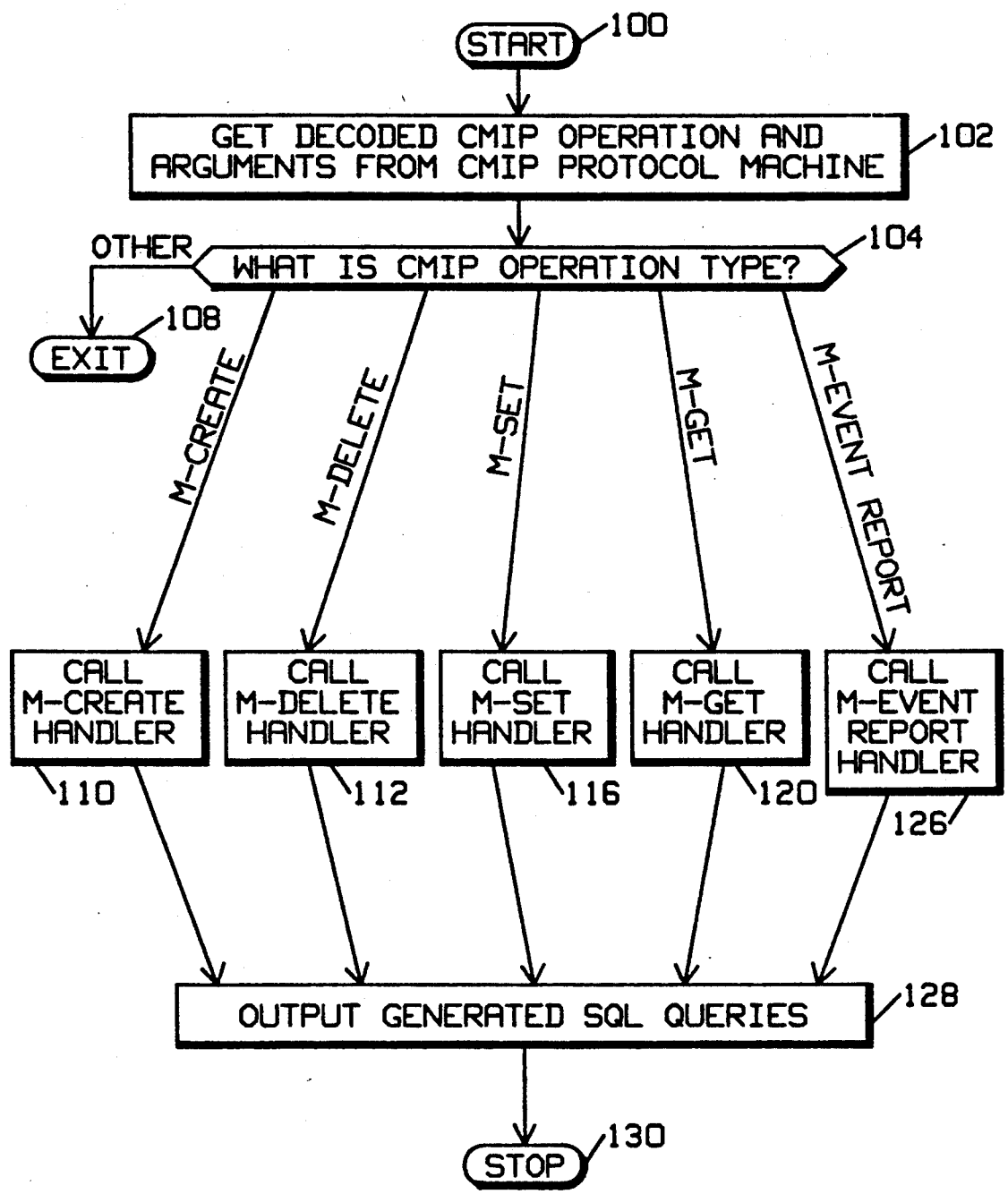
FIG. 2 is a flow chart of the main flow of the process of the present invention.

Table 2 demonstrates the analogies between CMIP operations and SQL data manipulation requests, as will become more apparent in the discussion of FIG. 2 to follow. The m-Create operation informs the network management system about a new managed object instance. In SQL, the creation of an object instance is analogous to an SQL INSERT command to add a new record (or set of records) in a database table (or tables). Similarly, the m-Delete operation indicates the removal of a managed object instance, and is analogous to the SQL DELETE command to remove a record (or a set of records) from a database table (or tables). The m-Get operation requests information on attributes of existing managed object instances, and is analogous to the SQL SELECT command which retrieves fields from existing records in a table (or tables). The m-Set operation requests modifications to attributes of existing managed object instances, and thus is analogous to an SQL UPDATE command which modifies field values of existing records in a table (or tables). The m-Event-Report operation may, depending on certain conditions, cause the insertion of records in a set of tables constituting the EventLog, which will require SQL INSERT commands to execute on those tables.

This invention mainly focuses on the above five CMIP operations. Those skilled in the art will recognize that extensions and modifications are possible within the scope of the invention. It should be noted that the m-Create, m-Delete and m-Get operations are always confirmed operations in the CMIS service definition, while m-Event-Report and m-Set may be either confirmed or unconfirmed. No distinction is made between the confirmed and unconfirmed operations, as their MIB data manipulation consequences are most often identical. It should also be noted that each of these operations may generate associated response and confirmation messages back to the originator of the request, which may be followed by various linked reply messages. While these are important parts in the implementation of the CMIP protocol machine, they are considered peripheral to the current invention insofar as their data manipulation consequences on a relational MIB are concerned.

Other CMIP operations—such as m-Cancel-Get and m-Action—are not specified in detail as their data manipulation consequences are, if at all, mostly incidental, and will be specific to the characteristics of the target managed object and the requirements of the network management system.

Given the knowledge of the MIB schema, the appropriate parameters in embedded in the CMIP Protocol Data Unit can be intelligently translated to column names and values in the SQL command. The subsequent sections describe the details of the processing of the CMIP-to-SQL translator 75. This process will be described as being applied to a reference database schema for the purposes of illustration. The reference schema chosen is the one described in above incorporated patent application. This is not a limiting assumption, as the same process, with appropriate modification of table names, column names, and query structure, could be applied to any other relational schema hosting a MIB 50 implementation. This reference database schema is not specific to any particular RDBMS vendor's product, as it could be hosted on any RDBMS platform.

Decoding a CMIP Request

It is assumed that in an OSI network management system, a complete or partial OSI protocol stack exists, along with all the required service elements at the application layer required for network management. It is also assumed that a CMIP protocol machine exists, which possesses the ability to recognize and decode a CMIP protocol data unit (PDU). It is further assumed that at Layer 6 of the OSI stack, the appropriate presentation mechanism exists for the encoding and decoding of CMIP PDUs in ASN.1, for delivery to the underlying layers and to a peer CMIS service user across the network. All these machine implementations are standard and commonly available, and so are not described, nor is their internal implementation of interest to the current invention. Of course, in environments where these assumptions do not hold, appropriate modifications can be made without departing from the invention.

The CMIP protocol which is machine resident in the network management system is assumed to communicate with other application-specific processes in the system. These may or may not correspond to a Single Association object (SAO) or a Multiple Association Object (MAO), as defined in the Application Layer Structure (ALS) OSI standard. These application processes know specific details about the machine on which they run, including details of the platforms on which the local MIB implementation is hosted. When the CMIP protocol machine has decoded an incoming request framed as a CMIP PDU, it then passes it on to an application-specific process, which determines if the request warrants action on the resident MIB implementation being hosted on a relational database. If it is determined that it does, the entire request, along with its associated arguments and parameters, is passed on the CMIP-to-SQL translator 75.

The translator 75 may or may not execute as a separate process. It could also be implemented as a set of library calls which are linked to another application process. The translator 75 also may or may not directly act upon the resident relational database. The SQL commands generated by the translator 75 may in fact be passed on to another process, for either immediate or delayed action on the relational database. The specific software processes supplying the translator 75 its input (decoded CMIP PDUs) and accepting its output (SQL commands) are not important for the current invention. From the point of view of the OSI stack, the translator 75 may be viewed as part of the CMISE-service-user (CMISE stands for Common Management Information Service Element—the software entity that actually encodes, decodes and interprets CMIP) aspect of OSI. The internal details and processes of the translator 75 are what is important.

FIG. 2 is a flow chart describing the main process flow of translator 75 starting at 100. The decoded CMIP operations and arguments are received from the CMIP protocol machine in step 102 after which the translator 75 makes a determination as to whether any of the five types of CMIP operations described in TABLE 2 are being performed, and if so, which one. In the case where none of these five operations are involved, the process exits at 108. In alternative embodiments, similar determinations may be made for other network management operations.

To determine the contents of a CMIP request at 104, we have already demonstrated in the earlier section the mapping between different types of CMIP operations to equivalent SQL commands. In FIG. 2, this is implemented by calling the m-Create handler at 110 when an m-Create operation type is detected at 104. Similarly them-Delete handler is called at 112 for an m-Delete operation; the m-Set handler is called at 116 for an m-Set operation; the m-Get handler is called at 120 for m-Get operations; and, the m-Event Report handler is called at 126 for m-Event Report operations. To completely construct a syntactically correct SQL command requires the decoding of all the arguments to the CMIP operation. The following description, expressed in ASN.1 notation, shows examples of specific arguments to CMIP operations.

```
CreateArgument ::= SEQUENCE {
    managedObjectClass          ObjectClass.
                                CHOICE {
                                managedObjectInstance    ObjectInstance,
                                superiorObjectInstance   [8] ObjectInstance }
                                                         OPTIONAL,
    accessControl               [5] AccessControl OPTIONAL,
    referenceObjectInstance     [6] ObjectInstance OPTIONAL,
    attributeList               [7] IMPLICIT SET OF Attribute OPTIONAL
    }
DeleteArgument ::= SEQUENCE {
    COMPONENTS OF               BaseManagedObjectId,
    accessControl               [5] AccessControl OPTIONAL,
    synchronization             [6] IMPLICIT CMISSync DEFAULT bestEffort,
    scope                       [7] Scope DEFAULT baseObject,
    filter                      [8] CMISFilter DEFAULT and {}
    }
EventReportArgument ::= SEQUENCE {
    managedObjectClass          ObjectClass,
    managedObjectInstance       ObjectInstance,
    eventTime                   [5] IMPLICIT GeneralizedTime OPTIONAL,
    eventType                   EventTypeId,
    eventInfo                   [8] ANY DEFINED BY eventType OPTIONAL
    }
GetArgument ::= SEQUENCE {
    COMPONENTS OF               BaseManagedObjectId,
    accessControl               [5] AccessControl OPTIONAL,
    synchronization             [6] IMPLICIT CMISSync DEFAULT bestEffort,
    scope                       [7] Scope DEFAULT baseObject,
    filter                      CMISFilter DEFAULT and {},
    attributeIdList             [12] IMPLICIT SET OF AttributeId OPTIONAL
    }
SetArgument ::= SEQUENCE {
    COMPONENTS OF               BaseManagedObjectId,
    accessControl               [5] AccessControl OPTIONAL,
    synchronization             [6] IMPLICIT CMISSync DEFAULT bestEffort,
    scope                       [7] Scope DEFAULT baseObject,
    filter                      CMISFilter DEFAULT and {},
    modificationList            [12] IMPLICIT SET OF SEQUENCE {
        modifyOperator          [2] IMPLICIT ModifyOperator DEFAULT replace,
        attributeId             AttributeId,
        attributeValue          ANY DEFINED BY attributeId OPTIONAL
                                -- absent for setToDefault }
    }
```

The above specify the detailed structure of the arguments for the CMIP operations defined earlier. These arguments also need some supporting type definitions defined as below in ASN.1 type notation:

```
Attribute ::= SEQUENCE {
    attributeId                 AttributeId,
    attributeValue              ANY DEFINED BY attributeId
    }
AttributeId ::= CHOICE {
    globalForm                  [0] IMPLICIT OBJECT IDENTIFIER,
    localForm                   [1] IMPLICIT INTEGER
    }
BaseManagedObjectId ::= SEQUENCE {
    baseManagedObjectClass      ObjectClass,
    baseManagedObjectInstance   ObjectInstance
    }
CMISFilter ::= CHOICE {
    item                        [8] FilterItem,
    and                         [9] IMPLICIT SET OF CMISFilter,
    or                          [10] IMPLICIT SET OF CMISFilter,
    not                         [11] CMISFilter
    }
CMISSync ::= ENUMERATED {
    bestEffort                  (0),
    atomic                      (1)
    }
EventTypeId ::= CHOICE {
    globalForm                  [6] IMPLICIT OBJECT IDENTIFIER,
    localForm                   [7] IMPLICIT INTEGER
    }
FilterItem ::= CHOICE {
```

```
                    -continued
    equality              [0] IMPLICIT Attribute,
    substrings            [1] IMPLICIT SEQUENCE OF CHOICE {
                              initialString   [0] IMPLICIT SEQUENCE {
                              attributeId     AttributeId,
                              string          ANY DEFINED BY attributeId }
                              anyString       [1] IMPLICIT SEQUENCE {
                              attributeId     AttributeId,
                              string          ANY DEFINED BY attributeId }
                              finalString     [2] IMPLICIT SEQUENCE {
                              attributeId     AttributeId,
                              string          ANY DEFINED BY attributeId }
                              }
    greaterOrEqual        [2] IMPLICIT Attribute,
                          -- asserted value > = attribute value
    lessOrEqual           [3] IMPLICIT Attribute,
                          -- asserted value < = attribute value
    present               [4] AttributeId,
    subsetOf              [5] IMPLICIT Attribute,
                          -- asserted value subset of attribute value
    supersetOf            [6] IMPLICIT Attribute,
                          -- asserted value superset of attribute value
    nonNullSetIntersection [7] IMPLICIT Attribute
    }
ModifyOperator ::= INTEGER {
    replace               (0),
    addValues             (1),
    removeValues          (2),
    setToDefault          (3)
    }
ObjectClass ::= CHOICE {
    globalForm            [0] IMPLICIT OBJECT IDENTIFIER,
    localForm             [1] IMPLICIT INTEGER
    }
ObjectInstance ::= CHOICE {
    distinguishedName     [2] IMPLICIT DsistinguishedName,
    nonSpecificForm       [3] IMPLICIT OCTET STRING,
    localDistinguishedName [4] IMPLICIT RDNSequence
    }
Scope ::= CHOICE {
    INTEGER {
        baseObject        (0),
        firstLevelOnly    (1),
        wholeSubtree      (2), }
    individualLevels      [1] IMPLICIT INTEGER
      -- positive integer indicates the level to be selected
    baseToNthLevel        [2] IMPLICIT INTEGER
      -- positive integer N indicates range of levels 0-N is to be selected
    }
```

The above are supporting definitions of the specific parameters involved in the arguments of the CMIP Operations. The translator 75, receiving its input from the CMIP protocol machine, analyzes the request based on the type definitions defined above. The translator 75 also possesses knowledge about the database schema for the MIB implementation. From this knowledge, the translator 75 is now ready to generate the equivalent SQL command based on its analysis of the CMIP request as will be described in greater detail later.

Upon exiting any of the operation handlers 110, 112, 116, 120 or 126, the generated SQL queries are output at step 128 and the routine terminates at 130.

Database Schema Basics

The database schema is understood to have the following characteristics or the equivalent thereof, based on the description supplied in the above incorporated patent application.

A set of normalized object tables and views, typically consisting of one table for each object class, with columns for storing attributes.

Join columns from each object class table to store the instance identifier values from the instance identifier columns of the table corresponding to its superclass in the object class hierarchy. This mechanism provides inheritance of attributes. Alternately, if the class hierarchy flattening technique is used, the object class tables may directly contain both their own direct attributes as well as inherited attributes.

One or more Containment tables, in which each record specifies one instance of a containment relationship, that is, the tuple consisting of one superior (containing) object instance and one subordinate (contained) object instance.

Optional Distinguished Name Mapping tables, to map the full Relative Distinguished Name of the object into a local representation of an object instance identifier.

Optional Object Identifier tables, containing a mapping from the primitive ASN.1 OBJECT IDENTIFIER type (which is a sequence of integers identifying arcs in the global object registration tree) to a simpler local representation of object identifiers.

Optional tables identifying what the allomorphic superclasses are for each managed object class Optional tables containing general directory information (complete distinguished name, local aliases, object class) for every managed object instance Attributes which are set-valued or sequence-valued, and contain an unspecified number of members, are normalized by isolating them in a separate table of their own, with an appropriate join column to tie in to the possessing object instance in its object table.

Attribute groups and conditional packages may be normalized by isolating them in separate tables, with an appropriate join column to tie in to the possessing object instance in its object table.

Other unspecified-size structured attributes, such as SEQUENCE OF or SET OF, are normalized by isolating them in separate tables, with an appropriate join column to tie in to the possessing object instance in its object table. Tables for isolated SEQUENCE OF attributes also have an extra column identifying their position in the sequence, which is significant.

Many variations may occur in the above schema layout in any given RDBMS implementation. The translator is presumed to be aware of any such variations in the RDBMS schema.

The specific treatment of each individual attribute depends on its specified syntax, and is described in the above incorporated patent application. With the above organization of the MIB 50 schema in a relational database, the translator 75 can now proceed with the generation of complete SQL commands.

Scoping in the RDBMS

Some CMIP operations may be specified to execute on one or more object instances. The term "scoping," as used herein, is intended to generally mean the selection of multiple objects as operands to the specific CMIP (or other network management) operations, based upon their position in the containment hierarchy, that is, selection of an administratively related collection of managed objects for application of the network management operation. If there are multiple operand objects for a CMIP operation, they are selected by identifying a particular subtree in the containment hierarchy. By identifying a particular containing object instance in the containment hierarchy, and by identifying a scope parameter, this multiplicity of object instances may be determined. The scope parameter applies to the node and all the descendants of that node in the subtree rooted at that node. The scope parameter may take values as specified in the "Scope" ASN.1 type definition above. Object instances selected by applying the scope parameter to the subtree will be collectively termed scoped objects.

Before any actual CMIP operation is applied, it is necessary for the translator 75 to determine to what object instance the operation is applied. This is achieved by the Scope() subroutine of the translator 75 as described in conjunction with FIGS. 3-6. Using this subroutine, the translator 75 performs the appropriate scoping to select objects from the containment hierarchy.

The translator 75 determines all objects which are scoped for the operation. Scoping applies to all operations which carry a scope parameter in their argument, that is, m-Delete, m-Get and m-Set. Each one of these operations also carries an argument member defined as "COMPONENTS OF BaseManagedObjectId", which according to the type notation above, is merely a SEQUENCE of a baseManagedobjectClass component and a baseManagedObjectInstance component. By examining these components, the translator 75 knows the baseManagedObjectInstance selected as the root of the subtree for scoping in the containment hierarchy.

Figure 3:
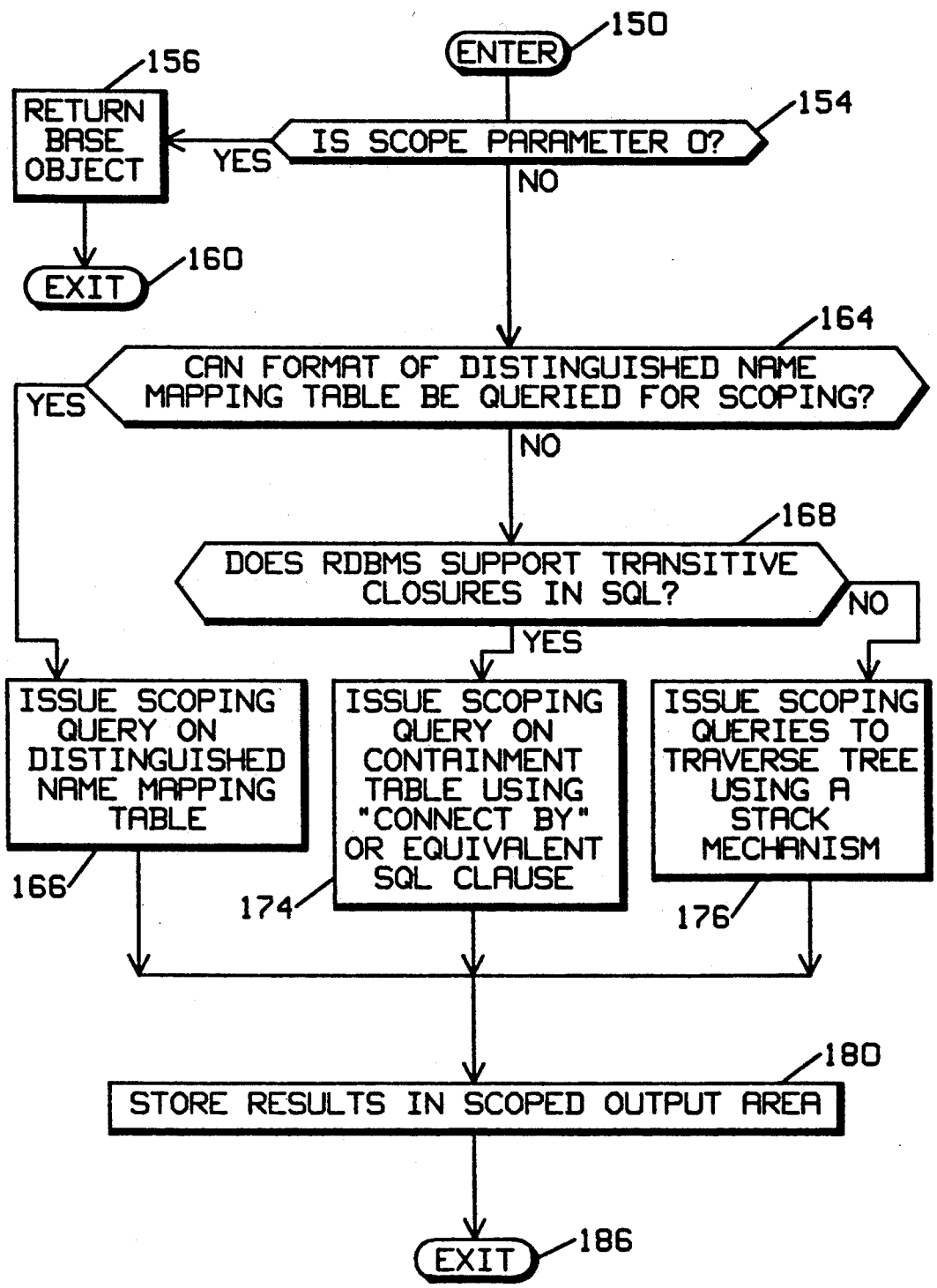
FIG. 3 is a flow chart of the scoping process in the present invention.
Figure 4:
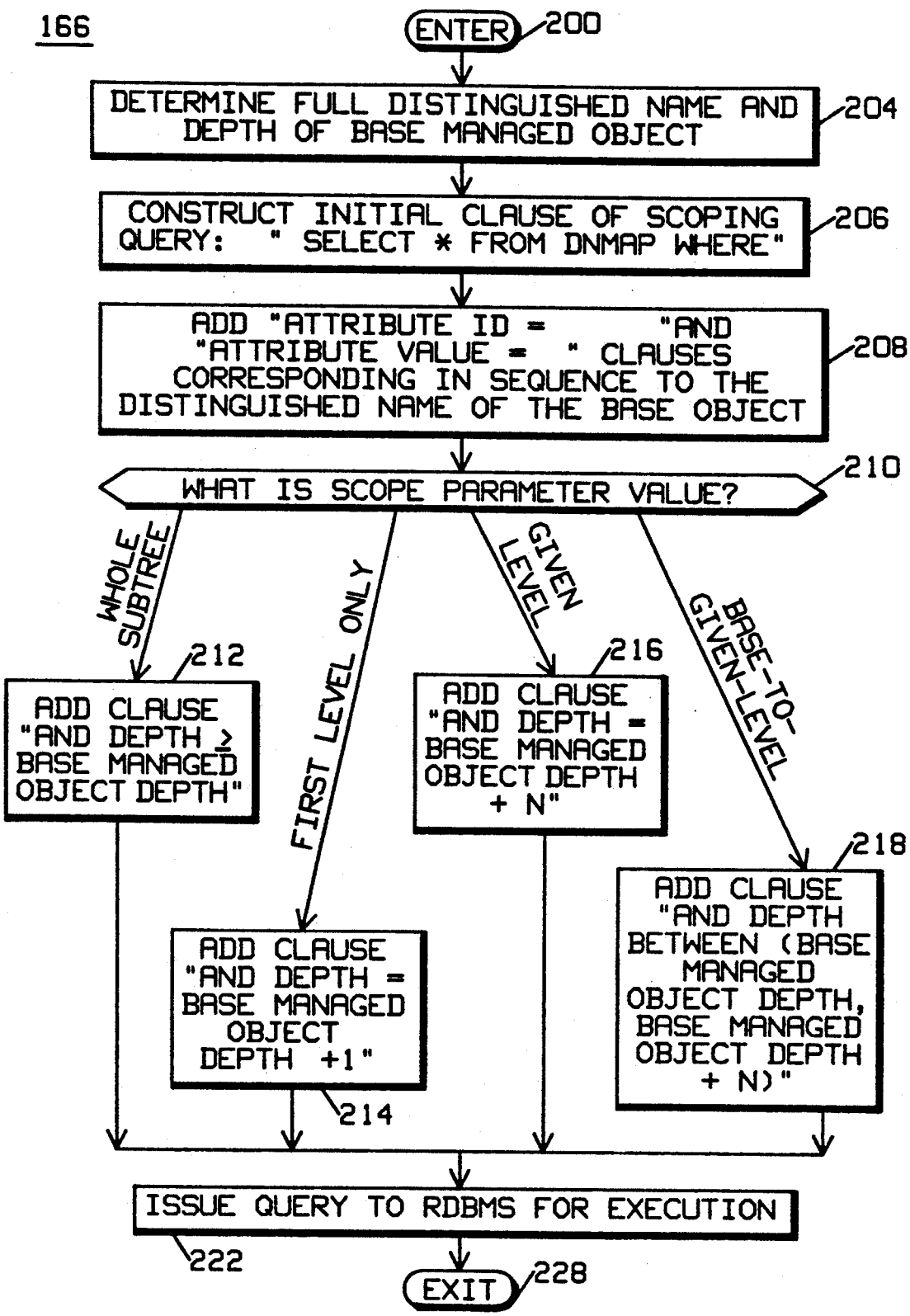
FIG. 4 is a flow chart of the process of issuing a scoping query on the distinguished name mapping table in the present invention.
Figure 5:
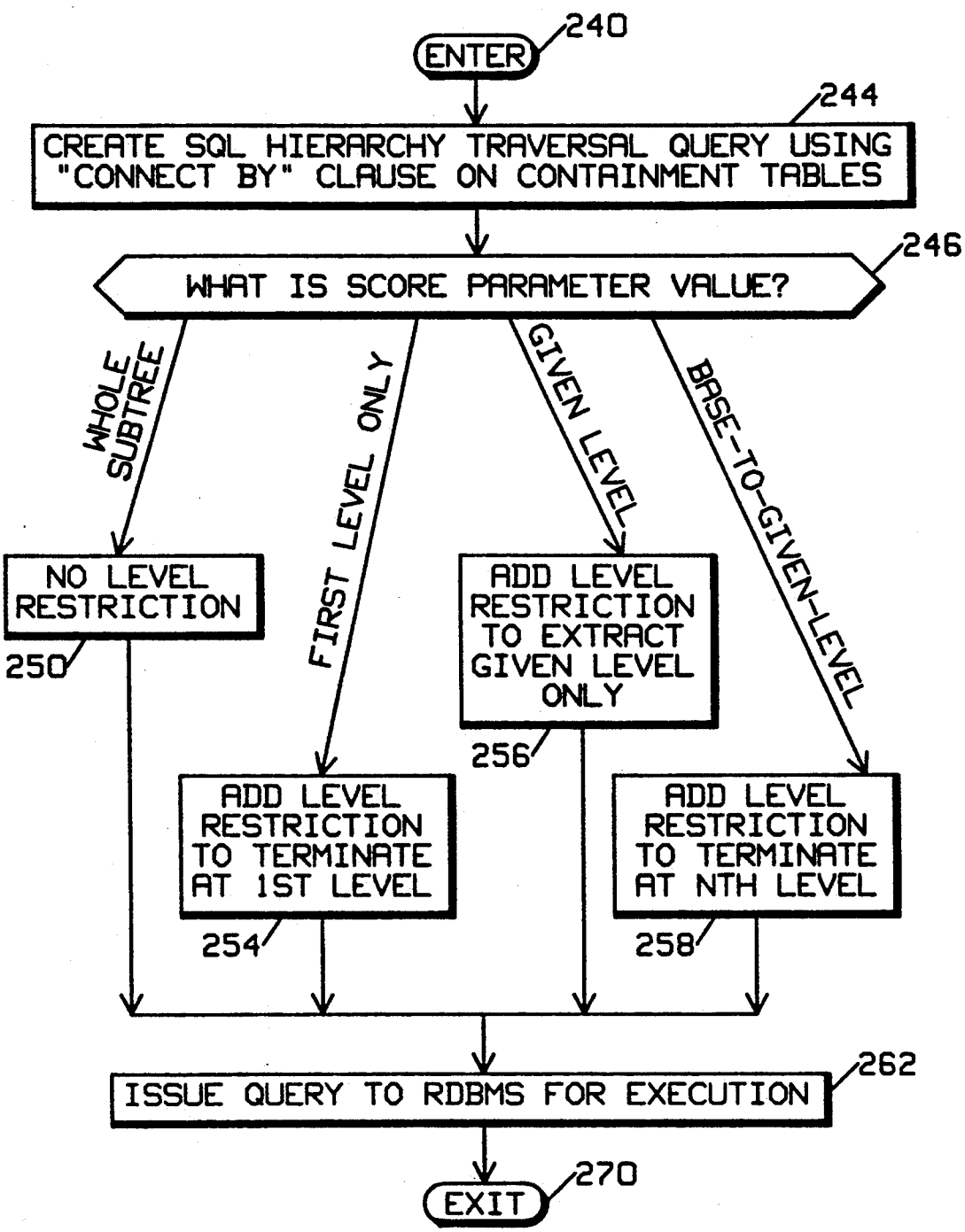
FIG. 5 is a flow chart of the process of issuing a scoping query using the "CONNECT BY" SQL clause in the present invention.
Figure 6A:
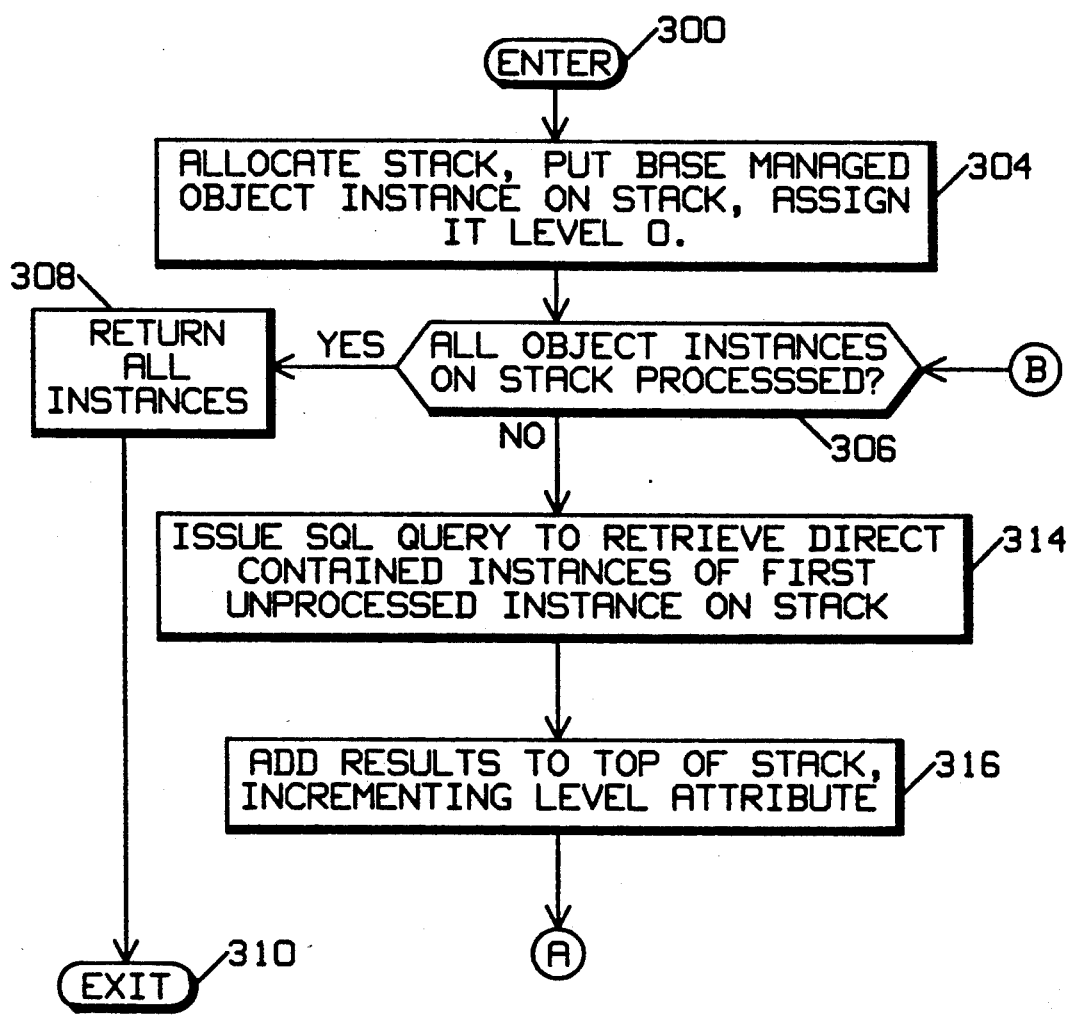
FIGS. 6A and 6B are flow charts of the process of issuing scoping queries using the stack mechanism in the present invention.
Figure 6B:
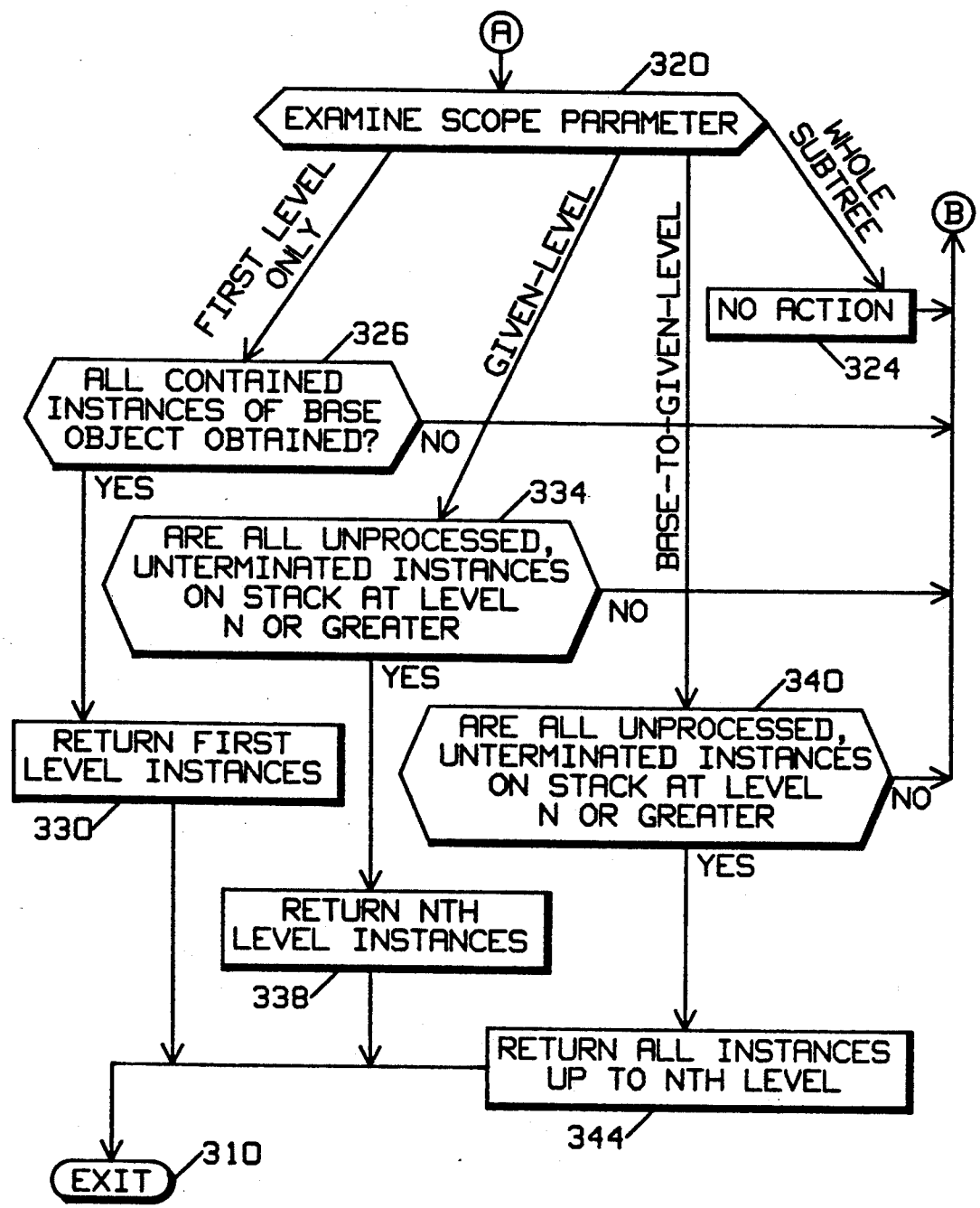

FIG. 3 shows the basic scoping process of the present invention beginning at step 150. The translator 75 examines the "scope" parameter in the argument at step 154. If the scope parameter is 0 (corresponding to baseObject only), there is no need to traverse the containment hierarchy as no contained objects are selected as operands. In this simple case, the scoping routine of the translator 75 returns immediately with only the base managed object instance as its result at step 156, and no further action is necessary. Accordingly, the routine exits at 160. All other cases require the downward traversal of the containment hierarchy, from the subtree rooted at that the baseManagedObjectInstance.

If the scope parameter is not 0 at 154, the routine determines if the format of distinguished name mapping table can be queried for scoping at step 164. If so, a scoping query is issued on the distinguished name mapping table at step 166. If not, the routine must determine if the RDBMS supports transitive closures in SQL at step 168. If so, the scoping query can be issued on the containment table using a "CONNECT BY" clause in SQL (or equivalent) at step 174. If not, the scoping queries are issued to traverse the tree using a stack mechanism at 176. In any of these three cases, the results are stored in the scoped output area at step 180 and the routine exits at 186. The scoped output area can be an area in computer memory, disk file or a database for temporarily storing the results of scoping.

If scoping can be obtained by queries to the distinguished name mapping table at step 164 of FIG. 3, this can be achieved in a straightforward manner by making a simple SELECT style query. This process is described in the flow chart of FIG. 4 which is entered at step 200. It is assumed that, as specified in the above incorporated patent application, the schema contains a table to map object distinguished names into local instance identifiers, where the entire name of the object is stored in a relation with the local instance identifier. Since the distinguished name is a representation of the containment hierarchy, by specifying appropriate columns for some of the higher containment values in this table and selecting wildcard values for the lower ones, scoping may be achieved. The example below demonstrates this effect.

The Distinguished Name Mapping Table is assumed to have the schema format:

DNMAP (DISTINGUISHED NAME MAPPING TABLE)

| Att Id1 | Att Val1 | Att Id2 | Att Val2 | Att Id3 | Att Val3 | ... | Table Name | Column Name | Inst Id | Depth |
|---------|----------|---------|----------|---------|----------|-----|------------|-------------|---------|-------|
|         |          |         |          |         |          |     |            |             |         |       |
|         |          |         |          |         |          |     |            |             |         |       |

This table is normally generated as a mechanism to map full distinguished names of objects (specified as a sequence of Attribute Value Assertions) to a local representation of an instance identifier, usually a simple numeric field. In practice, the number of pairs of repeating "Att Id" and "Att Val" columns would be the depth of search in the naming tree which the system is required to support in order to comply with a given set of implementation conformance requirements. The first step in this process, therefore, is to determine the full distinguished name and depth from this table at step 204.

Next, the scoping clauses are constructed at steps 206 and 208 as described in the flow chart. The scope parameter value is then examined at step 210 to determine the depth. Depending on whether the whole subtree is used, the first level only is used, a given level is used or base-to-given-level is used, the SELECT command is modified by one of steps 212, 214, 216 or 218 respectively to obtain the proper depth. The complete SELECT command is then issued at step 222 and the routine exits at 228.

The Attribute Id columns in the above table store the globally registered name of the attributes, which are ASN.1 Object Identifiers. These are the attributes used in naming the object instances, i.e. specified as the naming attribute in the NAME BINDING defining the containment of the instance in its superior instance. The encoding of Object Identifiers as fields to be stored in a single table column may be achieved using any implementation-specific textual or numeric convention. The Attribute Value columns store the actual value of the attribute for that instance; their type, most generally, depends on the type specified for the corresponding Attribute Identifier (ANY DEFINED BY AttributeId). In the current implementation, they are assumed to be text strings. It is felt that the most practical implementation of naming attributes would be either numeric or character strings, both of which can be easily represented in single table columns.

The "table name" and "column name" columns are optional, since the TableName can be determined from the ObjectClass attribute of the instance specified in the CMIP request. These, however, are included for full generality. The Depth attribute identifies the depth of the instance in the containment tree, and will be in general equal to the number of AttId and AttVal column pairs in the row which are non-null.

Note that the Distinguished Name Mapping table is really a horizontal, flattened representation of the Containment Hierarchy. That is, all object instances in the subtree rooted at the specified baseManagedObjectInstance have exactly the same initial prefixes of Attribute Value Assertions in their Distinguished Names, as the Distinguished Name of the baseManagedObjectInstance. Thus the full Distinguished Name of the baseManagedObjectInstance can be viewed as an "initial string" for all scoped objects contained within it. Taking advantage of this fact, we can now use this simply to effect scoping using the following process:

Find the depth of the baseManagedObjectInstance in the CMIP query by looking it up in the Distinguished Name Mapping Table based on its distinguished name.

If the scoping parameter is 0 (baseManagedObjectOnly), no further action need be taken.

If the scoping parameter is 2, then issue the query

| SELECT * FROM DNMAP WHERE | |
|---|---|
| AttId1 = baseManagedObjectAttId1 | AND |
| AttVal1 = baseManagedObjectAttVal1 | AND |
| AttId2 = baseManagedObjectAttId2 | AND |
| AttVal2 = baseManagedObjectAttVal2 | AND |
| ... | |
| AND DEPTH >= baseManagedObjectDepth | | where AttId and AttVal pairs are repeated as many times as there are Attribute Value Assertions in the Distinguished Name of the baseManagedObjectInstance. The value of baseManagedObjectDepth may be determined by a separate SQL query or a correlated subquery to the same table. This returns all the records in the containment tree, including the baseManagedObjectInstance itself, which satisfy the scoping criterion.

If the scoping parameter is 1 (first level only), the final clause changes to

AND DEPTH=baseManagedObjectDepth+1

If the scoping parameter is "individualLevels", specifying instances at a particular level N only to be selected, the final clause changes to AND DEPTH=baseManagedObjectDepth+N If the scoping parameter is "baseToNthLevel", indicating the entire subtree is to be selected but only to the Nth level, the final clause changes to AND DEPTH BETWEEN
(baseManagedObjectDepth,
baseManagedObjectDepth+N)

Thus, by querying the table mapping the distinguished names, (and thus, implicitly, the containment hierarchy), scoping may be achieved by issuing a single query to the table.

Alternatively, as described in the above incorporated patent application, the containment hierarchy may also be modeled as a table in a relational database, similar to the following:

| ContainingClass | ContainingInstance | ContainedClass | ContainedInstance |
|---|---|---|---|
| | | | |
| | | | | with each record indicating an instance of a containment relationship, that is, a record for every pair of containing and contained object instances. For the purposes of illustration, this table is given the name TCONTAINMENT.

Tree traversal using the above table is possible in a relatively straightforward manner if the underlying RDBMS supports the CONNECT BY (or equivalent) clause to provide transitive closure in its SQL language implementation as described by step 174 of FIG. 3. The process is described in greater detail in FIG. 5 which is entered at step 240. The CONNECT BY clause is generated at step 244 and allows the traversal of a tree-structured hierarchy in a relational table. The scope parameter is examined at 246 to determine what, if any, level restriction will be used at 250, 254, 256 or 258 in a manner similar to step 210 of FIG. 4 as described below. The translator 75 then generates the following SQL command:

```
SELECT ContainedClass, ContainedInstance, (LEVEL −1)
FROM TCONTAINMENT
    CONNECT BY      PRIOR ContainedInstance =
                    ContainingInstance
    AND PRIOR       ContainedClass = ContainedClass
    START WITH      baseManagedObjectClass,
                    baseManagedObjectInstance.
``` where base values are the local representations of the class name and instance identifier for the base object.

This statement will cause SQL to descend into the subtree rooted at the specified base node, and return all object instances thus generated. The LEVEL is a pseudo-column returned by SQL for each node, indicating the depth of the traversed node in the subtree. Since SQL originates LEVEL numbers at 1 (for the base object) whereas our convention defines the base node at level 0, we request the value (LEVEL −1) for each record for our convenience.

The above query is the basis for all subtree descents. If the scope parameter in the argument has value 2 (whole subtree), all records thus scoped are returned by the scope subroutine at 250. If this parameter has other values, all scoped records may not be required. The additional restrictions can be easily implemented as follows:

If the scope parameter is 1 (firstLevelOnly), add the clause

AND LEVEL=2 to the CONNECT BY (or equivalent) clause of the SQL query.

If the scope parameter is "individualLevels", specifying instances at a particular level N only to be selected, add the clause

AND LEVEL=N+1 to the CONNECT BY clause.

If the scope parameter is "basetoNthlevel", indicating that entire subtree is to be selected but only to the Nth level, add the clause

AND LEVEL<=N+1 to the CONNECT BY clause.

Once the CONNECT BY (or equivalent) clause is properly constructed, the query is issued to the RDBMS for execution at step 262 and the routine exits at step 270.

If the CONNECT BY (or equivalent) clause above does not accept multiple conditionals, this can easily be circumvented by applying just one conditional, saving the resulting projection in a temporary table, applying the next conditional to this table, and so on, until the desired set of records is obtained.

Note, however, that the CONNECT BY clause, or its equivalents, are not part of ANSI standard SQL (X3H2), but are only a value-added extension supported by some RDBMS vendors. If the underlying RDBMS does not support a CONNECT BY or equivalent clause, and provides no mechanism for recursive closure or a looping mechanism in its SQL language implementation, and if the distinguished name mapping table is not of a format which may support scoping by a query similar to the one described above, tree traversal for scoping becomes difficult and must be handled inside the subroutine rather than inside the RDBMS. This is achieved in the process by using a stack mechanism, as described in conjunction with FIG. 6. This process begins at step 300 after which the base managed object instance is placed on the stack and assigned a level of 0 at step 304. If all Object instances are processed at step 306, all instances are returned at step 308 and the routine exits at 310. Otherwise, control passes to 314 where an SQL query is issued to retrieve the direct contained instances of the first unprocessed instance on the stack. The results are added to the top of the stack at 316 and their level parameter is incremented by 1. The scope parameter is examined at step 320.

If the scope parameter is the whole subtree at 320, no action is taken at 324 and the process returns to 306. If the scope parameter is first level only, and all contained instances of the base object are obtained at 326 control returns to 306. If all contained instances of the base object are obtained at 326, the first level instances are returned at 330 and the routine exits at 310.

If the scope parameter is a given level at 320 and all containing instances at the preceding level are not processed at 334, control returns to 306. If all containing instances at the preceding level are processed at 334, the instances at the given level are returned at 338 and the routine exits at 310.

If the scope parameter is base-to-given-level and all containing instances up to the preceding level are not processed at step 340, the routine returns to step 306. Otherwise, all instances up to the given level are returned at 344 and the process exits at 310.

This process can be summarized as follows:

Put the baseManagedObjectInstance on the stack. Assign it the level value 0.

For every object on the stack which has not been processed, issue the SQL query
    SELECT ContainedClass, ContainedInstance
        FROM tcontainment WHERE ContainingClass=-
        currentStackObjectClass AND ContainingInstance=currentStackObjectInstance.

Assign to all the records returned by this query the level value one greater than the current object, and put them on the stack.

Proceed to the next object on the stack.

Terminate when all objects on the stack have been processed.

The translator 75 keeps track of which records on the stack have already been processed, and applies similar SQL queries, either recursively or in a loop, for every object on the stack, adding their results back onto the top of the stack. This recursion or looping will terminate when no more contained objects are discovered, and the entire stack has been processed. The stack now contains the entire subtree of the containment hierarchy rooted at baseManagedObjectInstance.

The above description is the general form of a tree traversal mechanism, which the translator 75 applies when the scope argument has a positive integer value of 2 (whole subtree). For all other cases, the following termination rules will apply:

If the scope argument is the integer 0 (baseObject only) or missing, no tree traversal or database queries are required, and the returned set of records consists merely of the baseManagedObjectInstance itself.

If the scope argument is the integer 1 (firstLevelOnly), only the first SQL query is required to determine the immediate descendants of baseManagedObjectInstance, and no further queries are required. The translator 75 then stops traversal at level 1 and does not proceed further. The returned set of records consists of the baseManagedObjectInstance and all its level 1 contained object on the stack.

If the scope argument is an implicit positive integer N indicating individual levels, the same mechanism must be used to traverse the stack, but the returned results only consist of the records at level N. In this case, the tree traversal need not continue once all the records at level N have been obtained, or if the tree branches terminate before level N is reached. The returned set of records consists only of the records at level N.

If the scope argument is an implicit positive integer N indicating baseToNthLevel, the same mechanism must be used to traverse the stack, but the returned results only consist of the records up to and including level N. In this case, the tree traversal need not continue once all the records at level N have been obtained, or if the tree branches terminate before level N is reached. The returned set of records consists only of the records whose level is at N or below.

Using the above queries, the table TCONTAINMENT in the RDBMS schema may be used to supply the set of object instances which satisfy the scoping requirements of the CMIP operation.

The results of executing the Scopes subroutine may be stored in memory by the translator 75, or in a temporary table created in the database for the purposes of the specific CMIP operation under process, or in any other convenient form of temporary storage, such as a disk file. The output of the scoping operation is referred to as scoped objects.

Filtering

Figure 7:
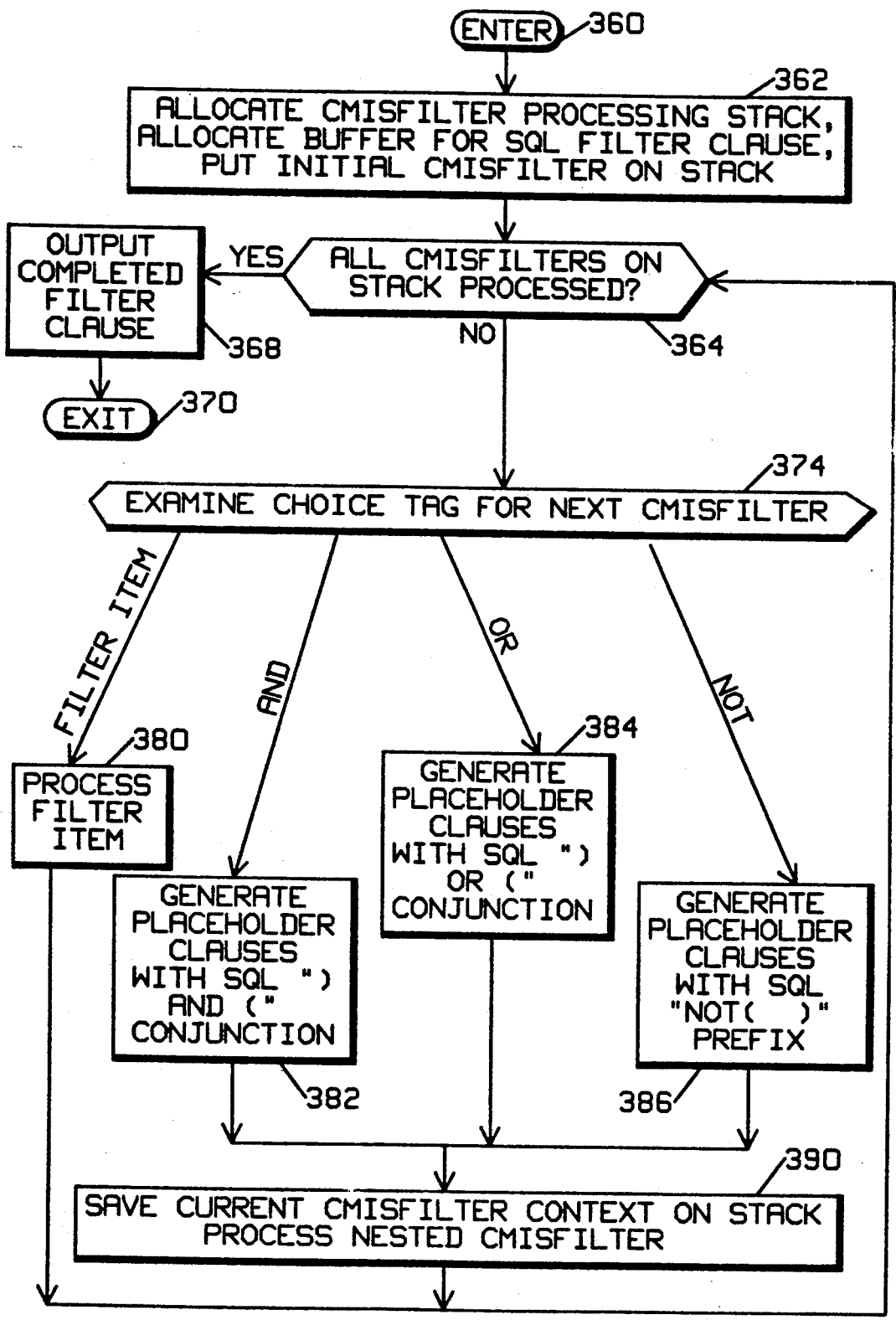
FIG. 7 is a flow chart of the filtering process in the present invention.

Filtering is the process of applying a test as to the presence of certain attributes, or a test as to the values of certain attributes, to all scoped objects, so that they may be selected for the final operation. The filtering process of the present invention is described in conjunction with FIGS. 7-11. The translator 75 applies the specified filter only to those objects which are the result of the scoping operation described above. Only the m-Set, m-Get and m-Delete operations require filtering. The main filtering process is shown in FIG. 7 beginning at step 360.

At step 362, the CMISFilter processing stack is allocated and the initial value is placed in the stack. In addition a buffer is allocated for the SQL filter clause. Step 364 determines if the filtering process is completed by checking to see if all CMISFilters on the stack are processed. If so, the completed filter clause is the output at step 368 and the process exits at step 370. If not, the choice tag for the next CMISFilter is examined at step 374.

The remaining processing depends on the outcome of this examination at 374. If the choice tag is a filter item, the filter item is processed at 380 and control returns to step 364. If the choice tag is AND, OR, or NOT, control passes to 382, 384 or 386 respectively where the appropriate placeholder clause is generated. Control passes from 382, 384 or 386 to step 390 where the current CMISFilter context is saved on the stack and processing begins on the next nested CMISFilter. Control then returns to step 364.

As can be seen from the specification of the Arguments, the filter component of the argument is specified as a CMISFilter, which is a logical predicate for conditions on attributes. The translator 75 analyses this filter component to determine exactly what type of SQL queries it should generate. This analysis is done by the Filter() subroutine of the translator 75. The output of this subroutine is a text string in a character buffer beginning with the keyword WHERE, which will eventually become a clause in a complete SQL query. This output character buffer is termed the Filter Clause.

The Filter() subroutine may be implemented recursively or in a loop construct. The terminating condition of this routine is the reduction of the CMISFIlter ASN.1 type in the filter component of the argument, to a set of all its component FilterItem types. The subroutine thus analyses the CMISFilter types until it internally generates no other CMISFilter types. This is accomplished using the process described below, after examining the CHOICE tag of the filter component (which is of type CMISFilter). The purpose of this process is to generate the appropriate predicates in SQL syntax which will qualify a WHERE clause when the complete SQL query is eventually constructed.

If the CHOICE tag is 8, the filter is a simple FilterItem, and the following SQL clause is prepared in a memory buffer which is allocated for the purpose:

([ . . . ])

in which [ . . . ] indicates a placeholder for an SQL predicate which will be inserted here after examining and analyzing the FilterItem.

If the CHOICE tag is 9, the filter is a set of other CMISFilter items which are "and"ed together, and multiple buffers are allocated and prepared, as many as there are components in the nested CMISFilter:

(([ . . . ]) AND ([ . . . ]) AND ([ . . . ]) AND . . . )

in which the [ . . . ] indicates each buffer corresponding to one nested CMISFilter type, which is a placeholder for an actual SQL predicate which will be filled in subsequently.

If the CHOICE tag is 10, the filter is a set of other CMISFilter items which are "or"red together, and multiple buffers are allocated and prepared, as many as there are components in the nested CMISFilter:

(([ . . . ]) OR ([ . . . ]) OR ([ . . . ]) .OR . . . )

in which the [ . . . ] indicates each buffer corresponding to one nested CMISFilter type, which is a placeholder for an actual SQL predicate which will be filled in subsequently.

If the CHOICE tag is 11, the filter is the negation of another CMISFilter item; one buffer is prepared, as follows:

(NOT ([ . . . ]) )

in which the [ . . . ] indicates the buffer corresponding to the nested CMISFilter type, which is a placeholder for an actual SQL predicate which will be filled in subsequently.

For every nested CMISFilter type thus determined, the same process is applied recursively, with further allocation of internal buffers if necessary in case the nested CMISFilter is also another nested CMISFilter type. This process continues until all the nested CMISFilter types are reduced to simple FilterItems. The nested relationship of such allocated buffers is maintained, so that, after the SQL predicates corresponding to the actual FilterItems have been filled in, the Filter Clause can be constructed by concatenating these buffers together in their proper order of nesting. The introduction of parenthesis as the delimiters for every nested buffer ensures the preservation of the semantics of the logical predicate as it is translated to SQL.

Thus, the completed Filter Clause is sufficient to determine all the object which are selected by filtering. This Filter Clause is only applied to the object instances, stored in the temporary table or elsewhere, which constitute the scoped output.

Figure 8:
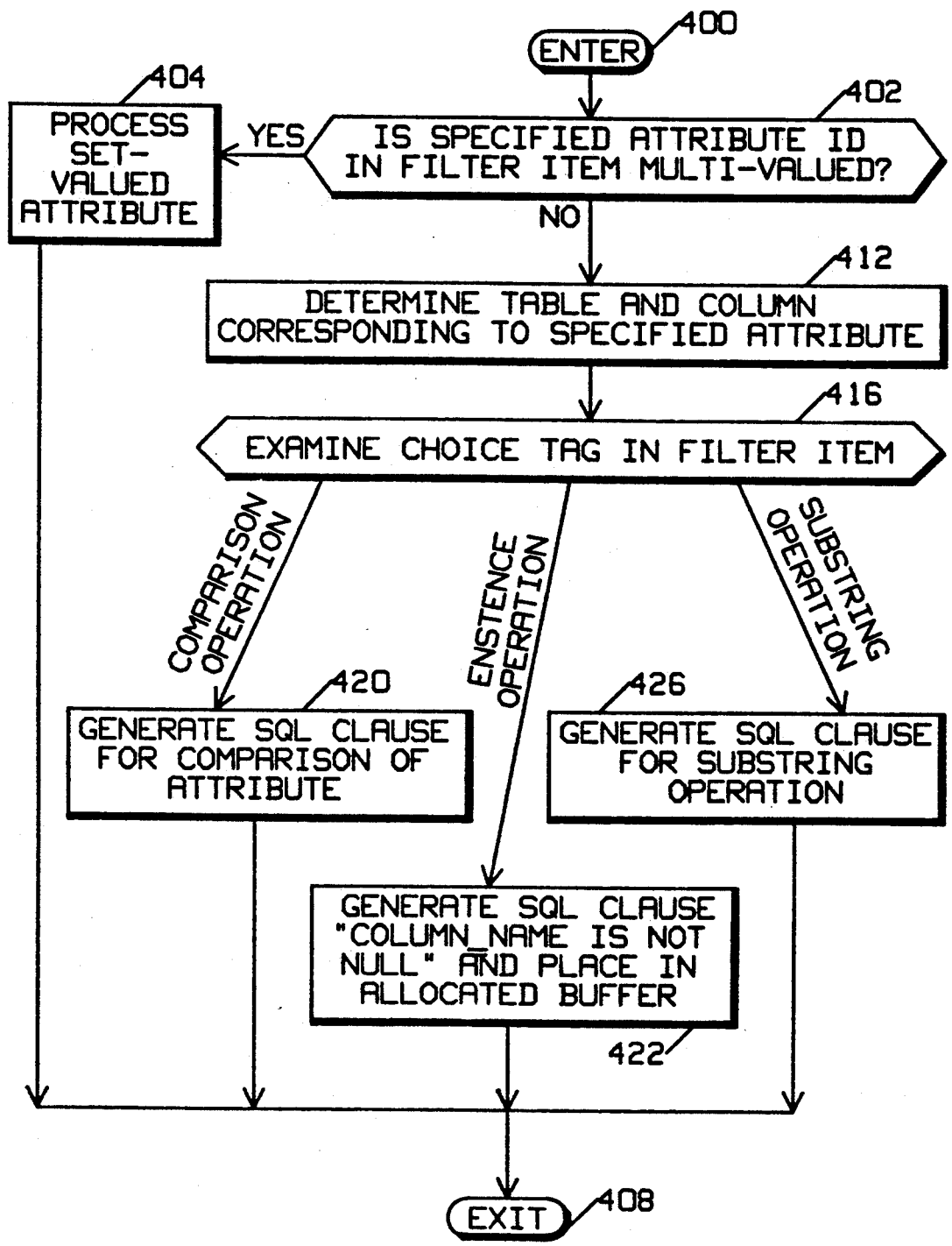
FIG. 8 is a flow chart of the processing of a filter item in the present invention.

The individual processing of each filter item is described in detail in conjunction with FIG. 8 beginning at step 400. Then, the routine determines if the specified attribute ID in the filter item is multi-valued at step 402. If so, the routine processes the set-valued attribute at 404 (see FIG. 9) and exits at 408. If not, control passes to step 412 where the table and column corresponding to the particular attribute is identified. To process each individual FilterItem in the CMISFilter, the choice tag of the FilterItem is examined at step 416. If a FilterItem is a comparison to be performed with respect to a specific attribute at 416, the routine generates a SQL clause for comparison of the attribute at step 420 (see FIG. 10) and then exits at 408. If a FilterItem is an existence operation at 416, the routine generates a SQL "column-name IS NOT NULL", where column-name is the name of the column in the table corresponding to the specified attribute, and places it in the allocated buffer at 422 and then exits at 408. If a FilterItem is a substring operation at 416, the appropriate SQL clause for substring operation is generated at 426 (see FIG. 11) and the routine exits at 408.

Figure 9:
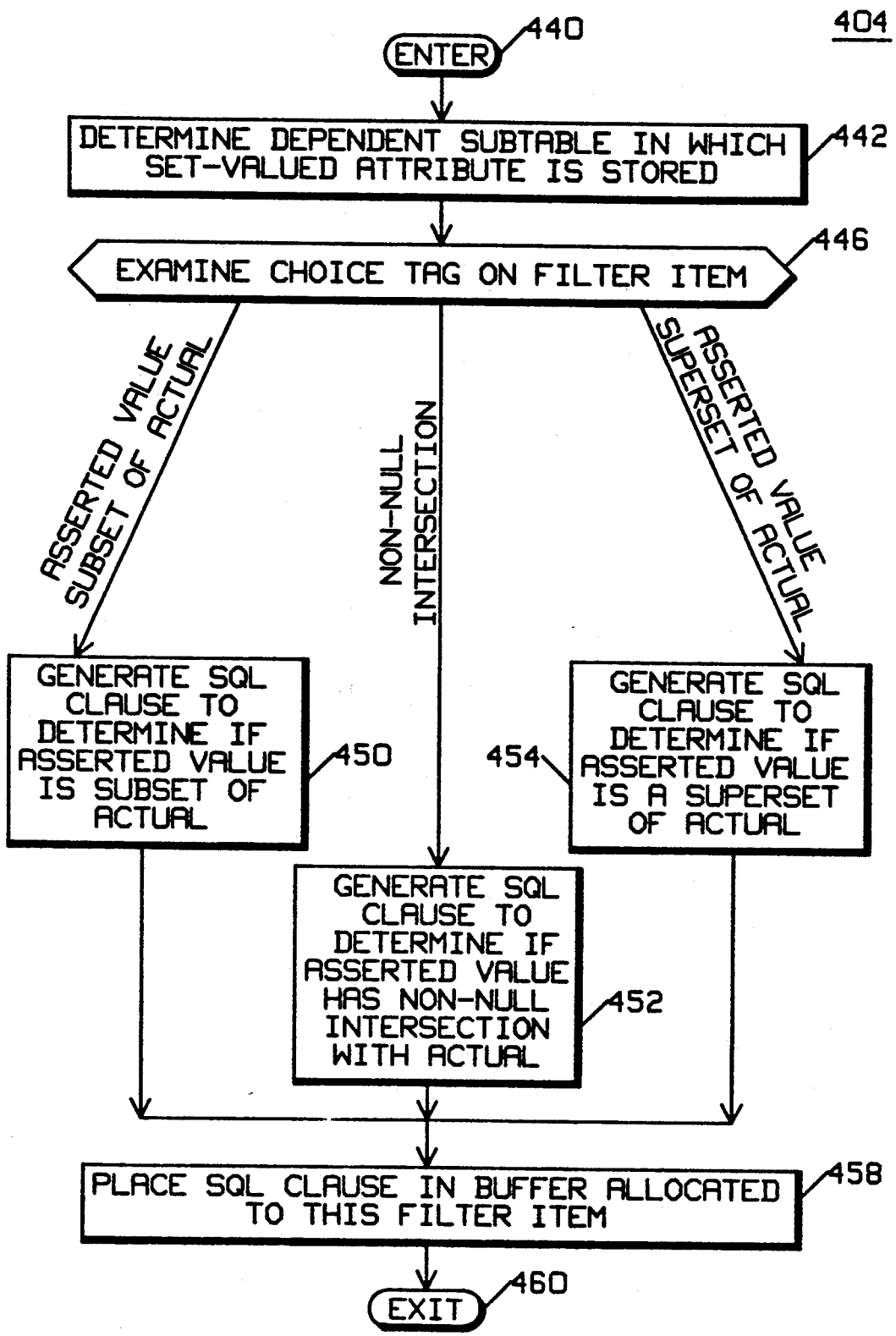
FIG. 9 is a flow chart of the processing of set-valued attributes in the present invention.

Turning to FIG. 9, the set-valued attribute process of step 404 is described in greater detail starting at 440. The routine determines the dependent subtable in which the set-valued attribute is stored at step 442, then examines the choice tag on the filter item at 446. Process control then goes to step 450, 452 or 454 for generation of the SQL clause depending upon whether the asserted value of the choice tag is a subset of the actual value, a non-null intersection with the actual value, or a superset of the actual value respectively. The SQL clause is then placed in the buffer at 458 and the routine exits at 460.

Figure 10:
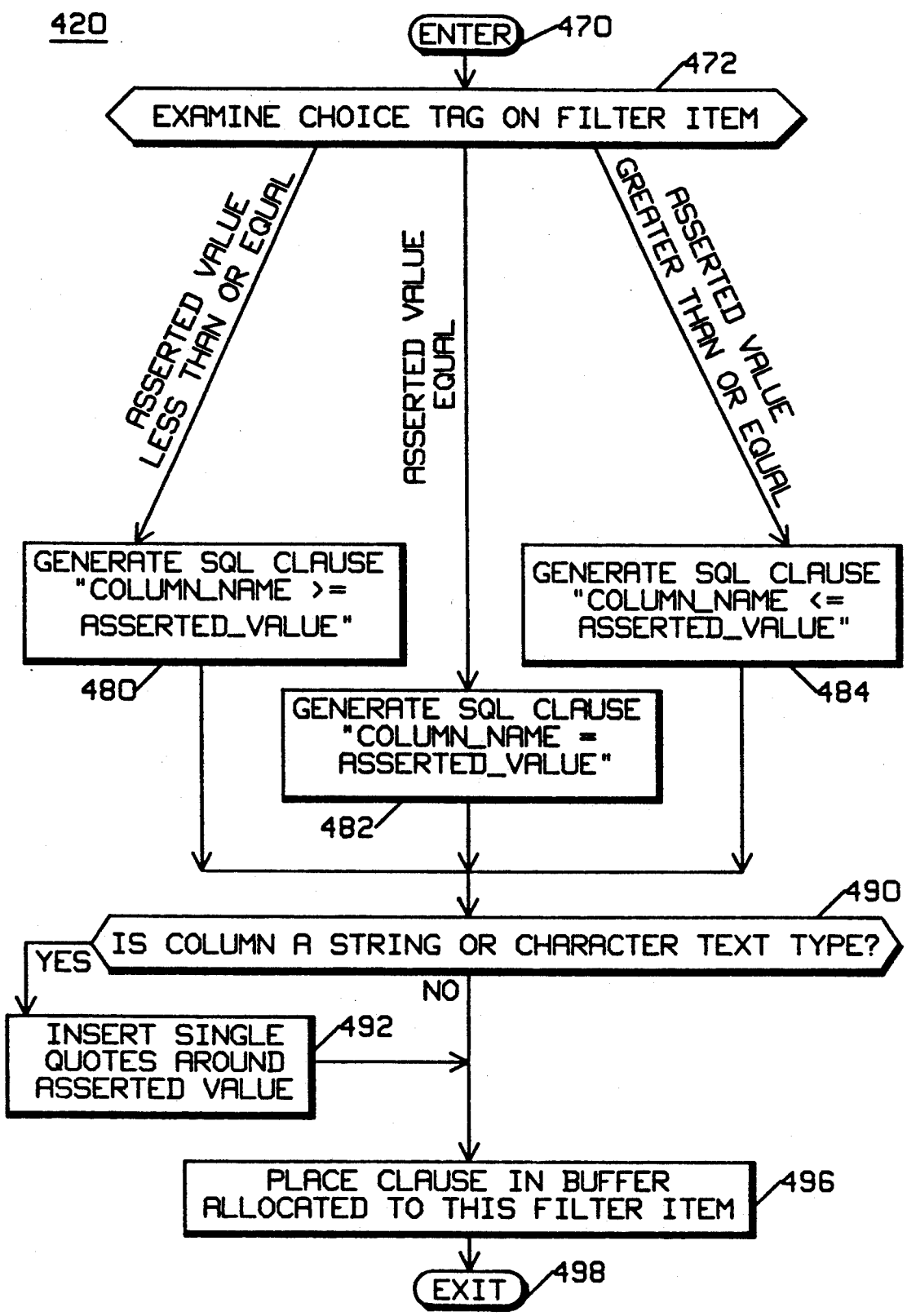
FIG. 10 is a flow chart of the process of generating SQL clauses for comparison of attributes in the present invention.

Turning to FIG. 10, the process of generating an SQL clause for comparison of the attribute of step 420 of FIG. 8 is shown in greater detail starting at step 470. The choice tag is examined at step 472 and depending upon whether the asserted value is less than or equal to, equal to, or greater than or equal to in 472, control goes to step 480, 482 or 484 respectively for generation of an appropriate SQL clause for setting the column name. Then, at step 490, the type of column is examined. If it is a string or character text type, single quotes are inserted around the asserted value at 492 and the SQL clause is placed in the buffer at 496. The routine exits at 498.

Figure 11:
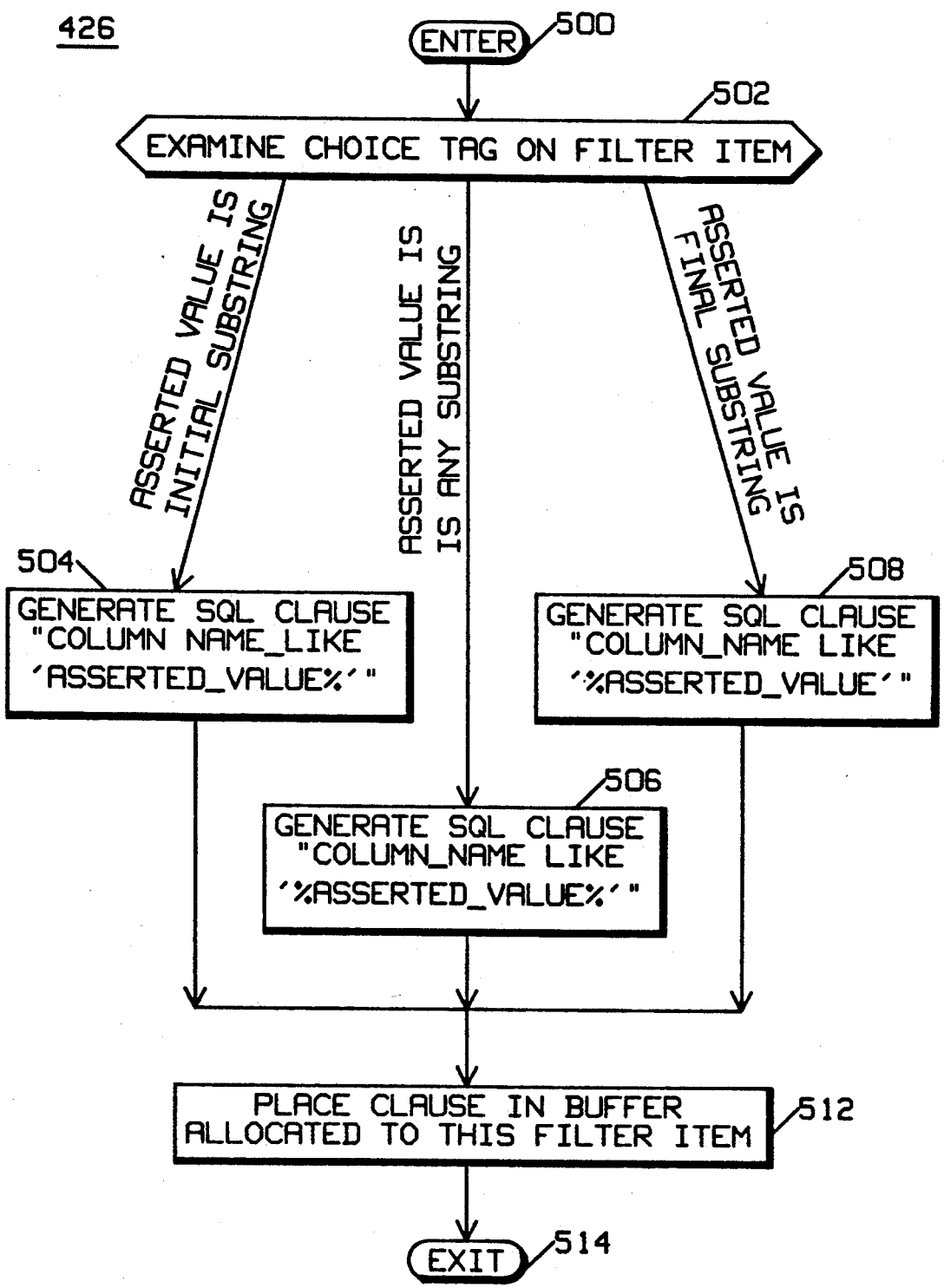
FIG. 11 is a flow chart of the process of generating a SQL clause for substring operations in the present invention.

In the case where an SQL clause is generated for substring operation at step 426 of FIG. 8, the process of FIG. 11 is used starting at step 500. Once again the choice tag is examined at 502 to determine if the asserted value is an initial substring, any substring or a final substring. Depending upon this examination, an SQL clause is generated at 504, 506, or 508 respectively to establish the column name. The appropriate SQL clause is then placed in the buffer at 512 and the routine exits at 514.

Summarizing the above processes, when the translator 75 examines the CHOICE tag for the FilterItem, which dictates what type of comparison operation which must be performed at step 416, it implements the following process to analyze each FilterItem:

If the choice tag is 0, the asserted value is to be compared for equality with the actual attribute value stored in the MIB. The Attribute component of the FilterItem is examined to determine which attribute must be compared. The column of the table for that object class whose name corresponds to the specified attributeId component of the Attribute type, is inserted into the SQL buffer. Then the string "=" is inserted to enforce the equality match. Finally, the value asserted in the attributeValue component is converted to its equivalent textual representation and inserted into the buffer. The completed SQL buffer now contains:

(column_name_corresponding_to_attribute_id-
=asserted_value)

If the proper syntax for the asserted attributeValue is any character string or textual type, the value is delimited by single quotes as required by SQL syntax:

(column_name_corresponding_to_attribute_id   =
'asserted_value')

If the choice tag is 2, the asserted value is to be compared for being greater than or equal to the actual attribute value stored in the MIB. The Attribute component of the FilterItem is examined to determine which attribute must be compared. The column of the table for that object class whose name corresponds to the specified attributeId component of the Attribute type, is inserted into the SQL buffer. Then the string "<=" is inserted to enforce the inequality match, reversing the sense of the inequality to satisfy SQL syntax restrictions. Finally, the value asserted in the attributeValue component is converted to its equivalent textual representation and inserted into the buffer. The completed SQL buffer now contains:

( column_name_corresponding_to_attribute_id   <=
asserted_value )

If the proper syntax for the asserted attributeValue is any character string or textual type, the value is delimited by single quotes as required by SQL syntax:

( column_name_corresponding_to_attribute_id   <=
'asserted_value' )

If the choice tag is 3, the asserted value is to be compared for being less than or equal to the actual attribute value stored in the MIB. The Attribute component of the FilterItem is examined to determine which attribute must be compared. The column of the table for that object class whose name corresponds to the specified attributeId component of the Attribute type, is inserted into the SQL buffer. Then the string ">=" is inserted to enforce the inequality match, reversing the sense of the inequality to satisfy SQL syntax restrictions. Finally, the value asserted in the attributeValue component is converted to its equivalent textual representation and inserted into the buffer. The completed SQL buffer now contains:

```
( column_name_corresponding_to_attribute_id    >=
asserted_value )
```

If the proper syntax for the asserted attributeValue is any character string or textual type, the value is delimited by single quotes as required by SQL syntax:

```
( column_name_corresponding_to_attribute_id    >=
'asserted_value' )
```

If the choice tag is 4, there is no asserted value; this is merely a test for the presence or absence of a value for the specified attribute. The AttributeId component of the FilterItem is examined to determine which attribute must be tested for presence. The column of the table for that object class whose name corresponds to the specified attributeId component of the Attribute type, is inserted into the SQL buffer. Then the string "IS NOT NULL" is inserted to test for the presence of a value for that attribute, under the understanding that if a value is not specified for that attribute of that object instance, a NULL will be stored in the column. The completed SQL buffer now contains:

```
(column_name_corresponding_to_attribute_id
    IS NOT NULL)
```

If the choice tag is 1, a substring comparison is to be performed between the asserted value and the actual attribute value stored in the MIB. The nature of the substring comparison depends on the tag of the nested CHOICE type in the filter item:

If the nested choice tag is 0, the asserted value is to be compared for being an initial substring of the actual attribute value stored in the MIB. The Attribute component of the FilterItem is examined to determine which attribute must be compared. The column of the table for that object class whose name corresponds to the specified attributeId component of the Attribute type, is inserted into the SQL buffer. The word "LIKE" is inserted, followed by a single quote. This is followed by the value asserted in the attributeValue component, which is converted to its equivalent textual representation. Then a percentage sign (%), indicating a SQL wildcard string match, inserted, followed by a closing single quote. The completed SQL buffer now contains:

```
(column_name_corresponding_to_attribute_id    LIKE
'asserted value%' )
``` which is SQL syntax for selecting those items for whom the specified attribute possesses the asserted string as an initial substring.

If the nested choice tag is 1, the asserted value is to be compared for being any substring of the actual attribute value stored in the MIB. The Attribute component of the FilterItem is examined to determine which attribute must be compared. The column of the table for that object class whose name corresponds to the specified attributeId component of the Attribute type, is inserted into the SQL buffer. The word "LIKE" is inserted, followed by a single quote, followed by a percentage (%) sign. This is followed by the value asserted in the attributeValue component, which is converted to its equivalent textual representation. followed by another percentage sign, followed by a closing single quote. The completed SQL buffer now contains:

```
(column_name_corresponding_to_attribute_id LIKE
'%asserted_value%')
``` which is SQL syntax for selecting those items for whom the specified attribute possesses the asserted string as any substring.

If the nest choice tag 2, the asserted value is to be compared for being a final substring of the actual attribute value stored in the MIB. The Attribute component of the FilterItem is examined to determine which attribute must be compared. The column of the table for that object class whose name corresponds to the specified attributeId component of the Attribute type, is inserted into the SQL buffer. The word "LIKE" is inserted, followed by a single quote, followed by a percentage sign. This is followed by the value asserted in the attributeValue component, which is converted to its equivalent textual representation. Then a closing single quote is inserted. The completed SQL buffer now contains:

```
(column_name_corresponding_to_attribute_id LIKE
'%asserted_value%' )
``` which is SQL syntax for selecting those items for whom the specified attribute possesses the asserted string as a final substring.

Other attribute filtering operations are based on set comparisons for set-valued or multi-valued attributes. Since under the conventions of a normalized database schema, unspecified-size set-valued attributes are isolated in a separate table of their own, this requires the evaluation of correlated SQL subqueries. These are described as follows:

If the choice tag is 7, the asserted set-value for the attribute is to be compared with the actual set value for the attribute, to determine if there is a non-null intersection of the two sets, that is, there is at least one element in the set constituting the attribute value which is also a member of the set constituting the asserted value. If such an element is found, the object instance possessing that attribute value passes the filter and is selected for the operation. The Attribute component of the FilterItem is examined to determine which attribute must be compared. The column of the table for that object class whose name corresponds to the specified attributeId component of the Attribute type, is determined from the isolated normalized subtable, whose name is determined from knowledge of the schema. The elements of the asserted set value are converted to a comma-separated textual representation. The SQL buffer is constructed as follows:

```
instance_identifier IN
(SELECT DISTINCT instance_identifier FROM subtable
WHERE
column_name_corresponding_to_attribute_id IN
(comma_separated_list_of_elements_of_asserted_set_value))
```

This inner correlated subquery results in selecting those object instances from the subtable which have at least one element of the specified set-valued attribute in common with the elements of the asserted set value. This clause then becomes a complete logical predicate being constructed for the Filter Clause.

If the choice tag is 5, the asserted set-value for the attribute is to be compared with the actual set value for the attribute, to determine if the asserted value is a subset of the actual value, that is, every element in the set constituting the asserted value is also a member of the set constituting the attribute value. If such is determined to be the case, the object instance possessing that attribute value passes the filter and is selected for the operation. The Attribute component of the FilterItem is examined to determine which attribute must be compared. The column of the table for that object class whose name corresponds to the specified attributeId component of the Attribute type, is determined from the isolated normalized subtable, whose name is determined from knowledge of the schema. The number of elements in the asserted value set is determined, and the elements of the asserted set value are converted to a comma-separated textual representation. The SQL buffer is constructed as follows:

```
instance_identifier IN
(SELECT DISTINCT instance_identifier FROM subtable
WHERE
column_name_corresponding_to_attribute_id IN
(comma_separated_list_of_elements_of_asserted_set_value)
AND
COUNT (DISTINCT instance_identifier) =
number_of_elements_in_asserted_value )
```

This inner correlated subquery results in selecting those object instances from the subtable which possess the elements of the asserted set value as a subset of the actual attribute set value. This clause then becomes a complete logical predicate being constructed for the Filter Clause.

If the choice tag is 6, the asserted set-value for the attribute is to be compared with the actual set value for the attribute, to determine if the asserted value is a superset of the actual value, that is, every element in the set constituting the actual attribute value is also a member of the set constituting the asserted value. If such is determined to be the case, the object instance possessing that attribute value passes the filter and is selected for the operation. The Attribute component of the FilterItem is examined to determine which attribute must be compared. The column of the table for that object class whose name corresponds to the specified attributeId component of the Attribute type, is determined from the isolated normalized subtable, whose name is determined from knowledge of the schema. The elements of the asserted set value are converted to a comma-separated textual representation. The SQL buffer is constructed as follows:

```
instance_identifier IN
(SELECT DISTINCT instance_identifier FROM subtable
WHERE
instance_identifier NOT IN
(SELECT DISTINCT instance_identifier FROM subtable
WHERE
column_name_corresponding_to_attribute_id IN
(comma_separated_list_of_elements_of_asserted_set_value)))
```

This inner correlated subquery results in selecting those object instances from the subtable for which every elements of the actual attribute set value is also a member of the asserted set value. This clause then becomes a complete logical predicate being constructed for the Filter Clause.

It should be noted that there are many different ways of expressing the above correlated subqueries in SQL in order to obtain subset, superset, and non-null intersecting set operations between the asserted set value and the actual attribute set value. The above are merely examples of one such way. In particular, it also possible to create temporary tables corresponding the actual attribute and asserted values, and then use the SQL UNION, INTERSECTION and MINUS operators on these tables. It is also possible to use SQL merely to select all records from the relevant tables, and perform the subsetting, supersetting and non-null intersection comparisons in application software, such as in a subroutine of the translator 75. This invention is intended to cover all variations which may occur to those skilled in the art.

The final output of the filter analysis subroutine is the Filter Clause, which is the complete clause specifying the predicates to be applied to the scoped output for selecting them for operation.

Preprocessing for Scoped and Filtered CMIP Operations

Scoping and filtering generally apply to the CMIP m-Get, m-Set and m-Delete operations. Note, however, the information to be acted upon as the result of the scoping, will generally be resident in many different MIB database tables. This is because the scoped output contains a list of object instances which will in general belong to different object classes. Thus, a single SQL statement will not in general suffice to satisfy the requirements of scoped CMIP operations; multiple such statements must be generated, one for each distinct class of objects in the scoped output. The process of FIG. 12 is implemented to handle this situation.

Figure 12:
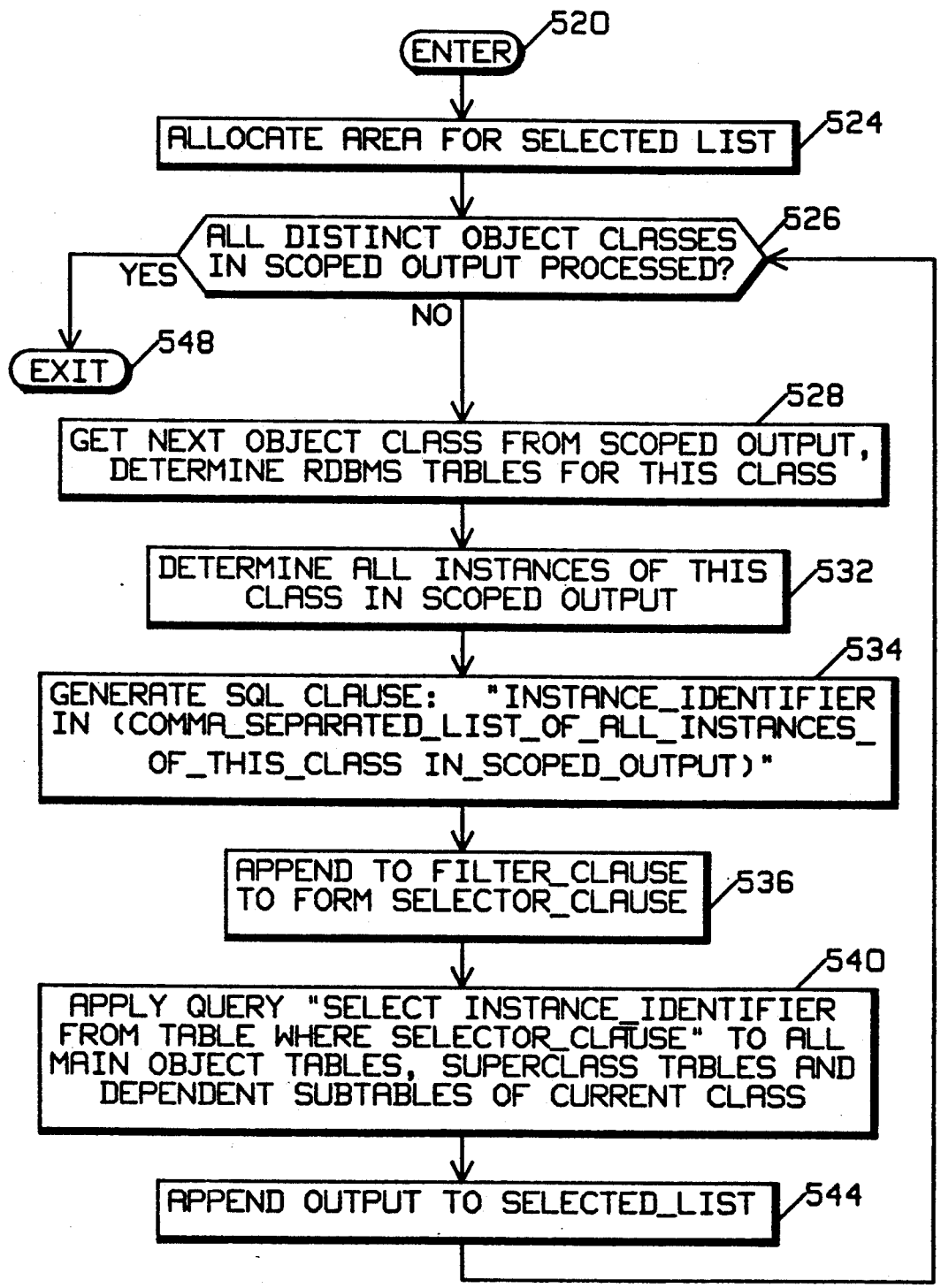
FIG. 12 is a flow chart of the process of combining the results of scoping and filtering in the present invention.

The following process of FIG. 12 is employed by the translator 75 to combine the results of both scoping and filtering. Remember that the result of scoping is a list of object instances along with their associated class information, and the result of filtering is an SQL WHERE clause containing predicates for testing values of attributes. Armed with this information, the translator 75 starts the process at 520 and an area is allocated for the selected list at step 524. If all distinct object classes in the scoped output have not been processed, the next object class is retrieved and the RDBMS tables are determined for this class at 528. All instances of the class are determined in the scoped output at 532 and an appropriate SQL clause is generated in step 534. The filter clause is appended at step 536 and the query is applied to all appropriate tables at step 540. The output of executing this query is then appended to the selected list at 544. Control then returns to 526 until all distinct object classes are processed at which point the routine exits at step 548. This process can be summarized by the following pseudocode:

Allocate a special area in memory or disk and designate it the Selected_List. This will be used to store the results of both the scoped and filtered output.

Determine the list of all distinct object classes from the object instances in the scoped output.

For each distinct object class in the scoped output:
Determine the list of all object instances belonging to that class in the scoped output. Cast this in a comma-separated textual representation. This is termed the scoped_instances_of current_class.

Construct the SQL clause
AND instance_identifier IN (scoped_instances_of_current class)

Append this clause to the Filter Clause. Term the Filter Clause thus augmented the Selector Clause.

Determine the main object class table in the MIB 50 schema associated with the current object class. Determine also the object class tables for all associated superclasses for the current object class. Further, determine all dependent subtables which are linked to the main object class table by virtue of normalization on group attributes, conditional packages, unspecified-size set-valued attributes, etc.

For each such selected table:

Examine the complete Selector Clause. If the Selector Clause references an attribute (column name) not appropriate to the table, and the predicate on the attribute is "or"red with other predicates either at the same level or an outer level, drop the complete OR operand predicate (at the same level or outer level) from the WHERE clause, to prevent the occurrence of an SQL syntax error. If the clause references an attribute (column name) not appropriate to the table, and the predicate either stands alone or is "and"ed with other predicates, the entire Selector Clause is inapplicable to the table as no entries in the table would be selected. Thus, skip the entire table and go to the next table.

If the translator 75 decides that the Selector Clause is applicable to the table, then, construct the following SQL query in a character text buffer:

SELECT instance_identifier FROM table WHERE
(Selector Clause)

in which the complete Selector Clause is included.

Execute the above query in the RDBMS, and store its output in the Selected_List.

Go to the next table associated with the current object class.

Note that the above procedure will be modified if a join can be created for all tables related to the same main object class, including joins into the superclass tables and into dependent subtables. In this case, the SQL SELECT query may be issued across the join, and not across individual tables. Alternatively, if a view has been predefined in the database effecting all these joins, the SELECT need only query the view. In addition, if Class Hierarchy Flattening has been used to directly store inherited attributes along with the tables for instantiated subclasses, only the main object class table for the current class and its dependent tables need be queried.

Go to the next object class selected in the scoped output.

At the end of this sequence, the Selected_List area will contain a list of instance identifiers which are the object instances which have survived both scoping and filtering. It is to this list that we now apply the actual CMIP operation.

Processing for CMIP m-Delete Operations

Figure 13:
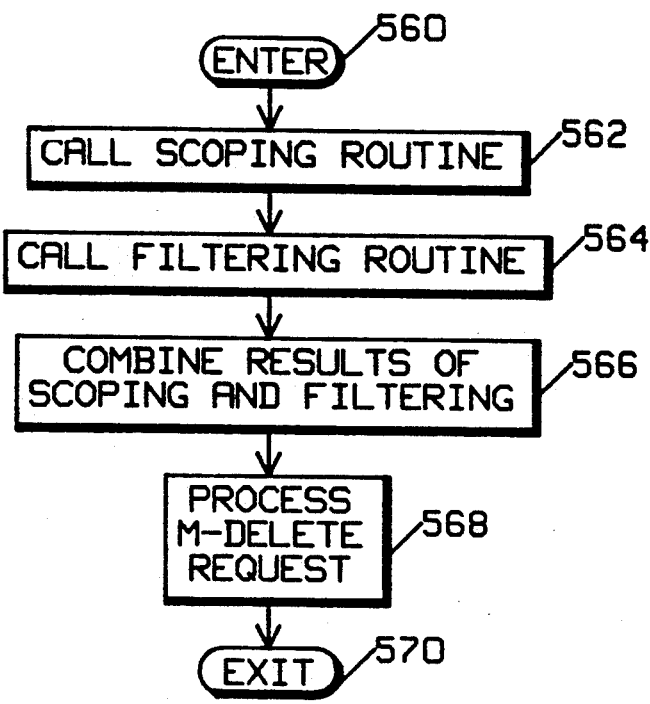
FIG. 13 is a flow chart of the m-Delete handler process in the present invention.

The m-Delete operation 112 is broadly described in conjunction with FIG. 13. The process starts at 560 and the filtering and scoping routines described above are called at 562 and 564 respectively. The results are combined as described in the preceding section at step 566. The m-Delete request is then processed at 568 and the routine exits at 570.

Figure 14:
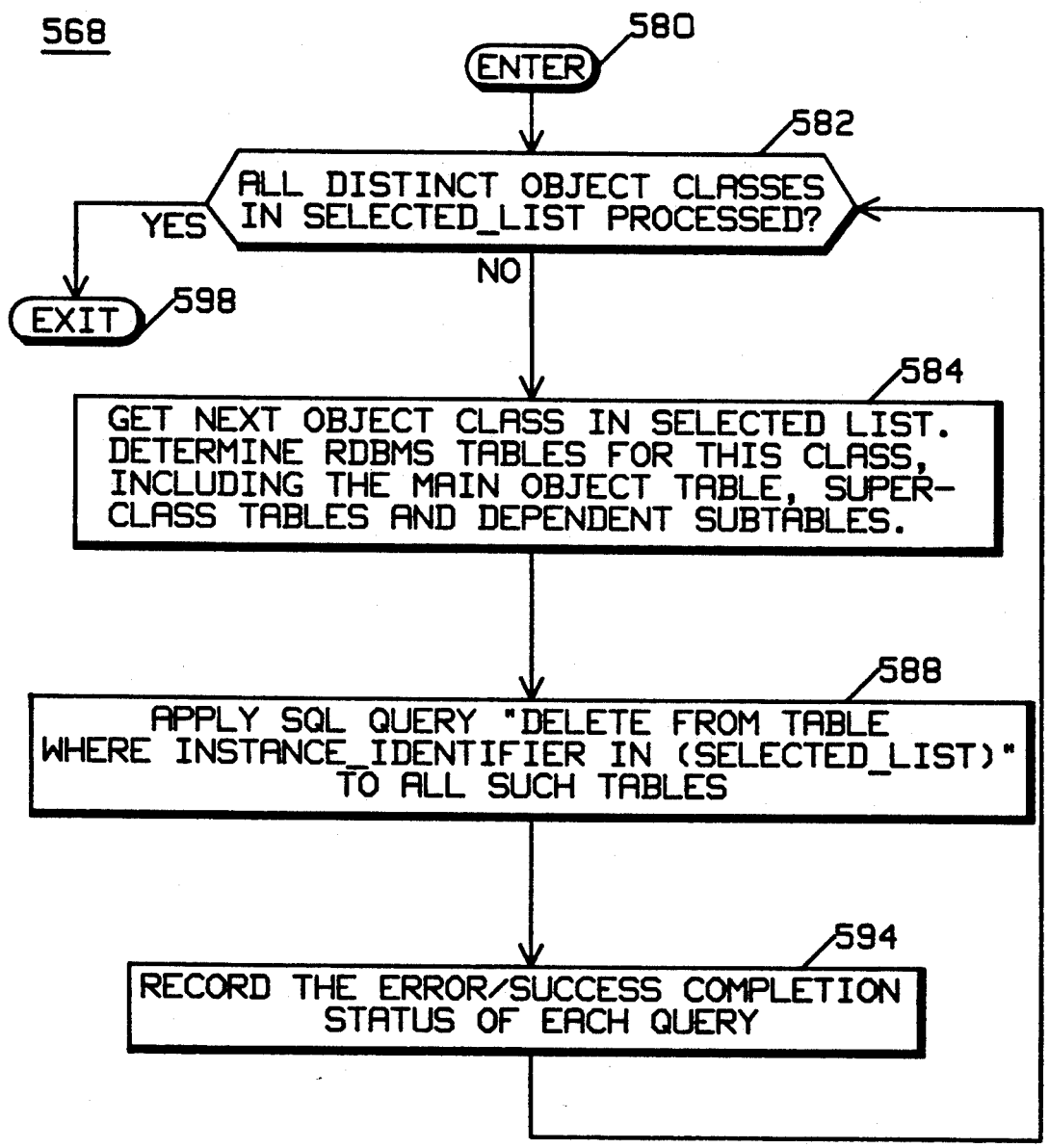
FIG. 14 is a flow chart of the processing of m-Delete requests in the present invention.

The processing of an m-Delete request is described in greater detail in connection with FIG. 14 starting at step 580. For an m-Delete operation, a number of SQL DELETE FROM commands need to be executed. This is done by looping around the set of object class tables resulting from the scoping and filtering operation. Step 582 determines when the looping is finished. If all distinct object classes in the selected list are not processed at 582, the next object class is retrieved at 584 and the appropriate tables are selected. The SQL query is applied at 588 and step 594 records the status of each query. Control then returns to step 582 until all distinct object classes have been so processes, at which point the routine exits at 598.

This process can be described with the following pseudocode:

For each distinct object class for the object instances in the Selected_List:

Determine the main object class table in the MIB schema associated with the current object class. Determine also the object class tables for all associated superclasses for the current object class. Further, determine all dependent subtables which are linked to the main object class table by virtue of normalization on group attributes, conditional packages, unspecified-size set-valued attributes, etc.

For each such selected table:
Create the following SQL command in a text buffer:
DELETE FROM table WHERE instance_identifier
IN (Selected_List)

in which the Selected_List is the set of instance identifiers which is the result of both scoping and filtering.

Pass the command onto the SQL RDBMS for immediate or subsequent execution.

Go to the next table (Note the above case query also covers the case when the attribute is set-valued in a dependent subtable, or when an attribute group or conditional package has been isolated in a dependent subtable for normalization).

Go to the next object class.

Processing of CMIP m-Get Operations

Figure 15:
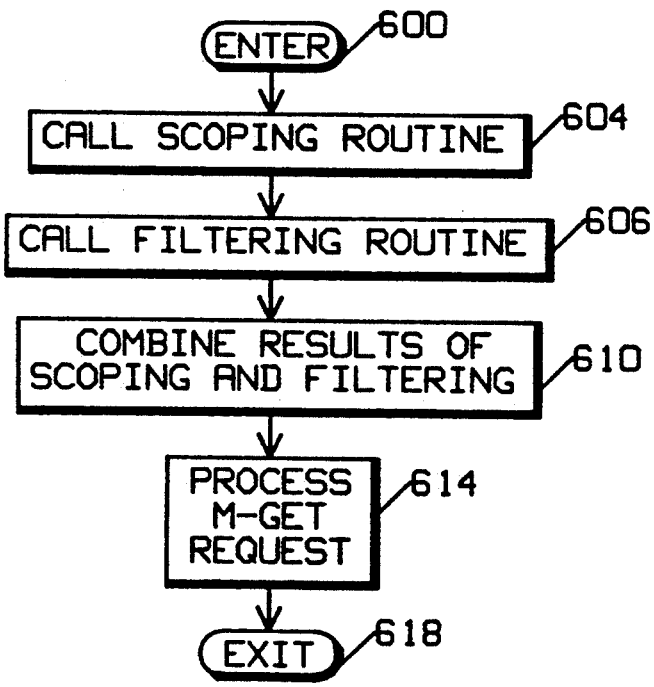
FIG. 15 is a flow chart of the m-Get handler process in the present invention.

The m-Get operation of step 120 is described in conjunction with FIG. 15 starting at step 600. The scoping and filtering routines are called at 604 and 606 and combined at 610. The m-Get request is processed at 614 and the routine exits at 618.

Figure 16:
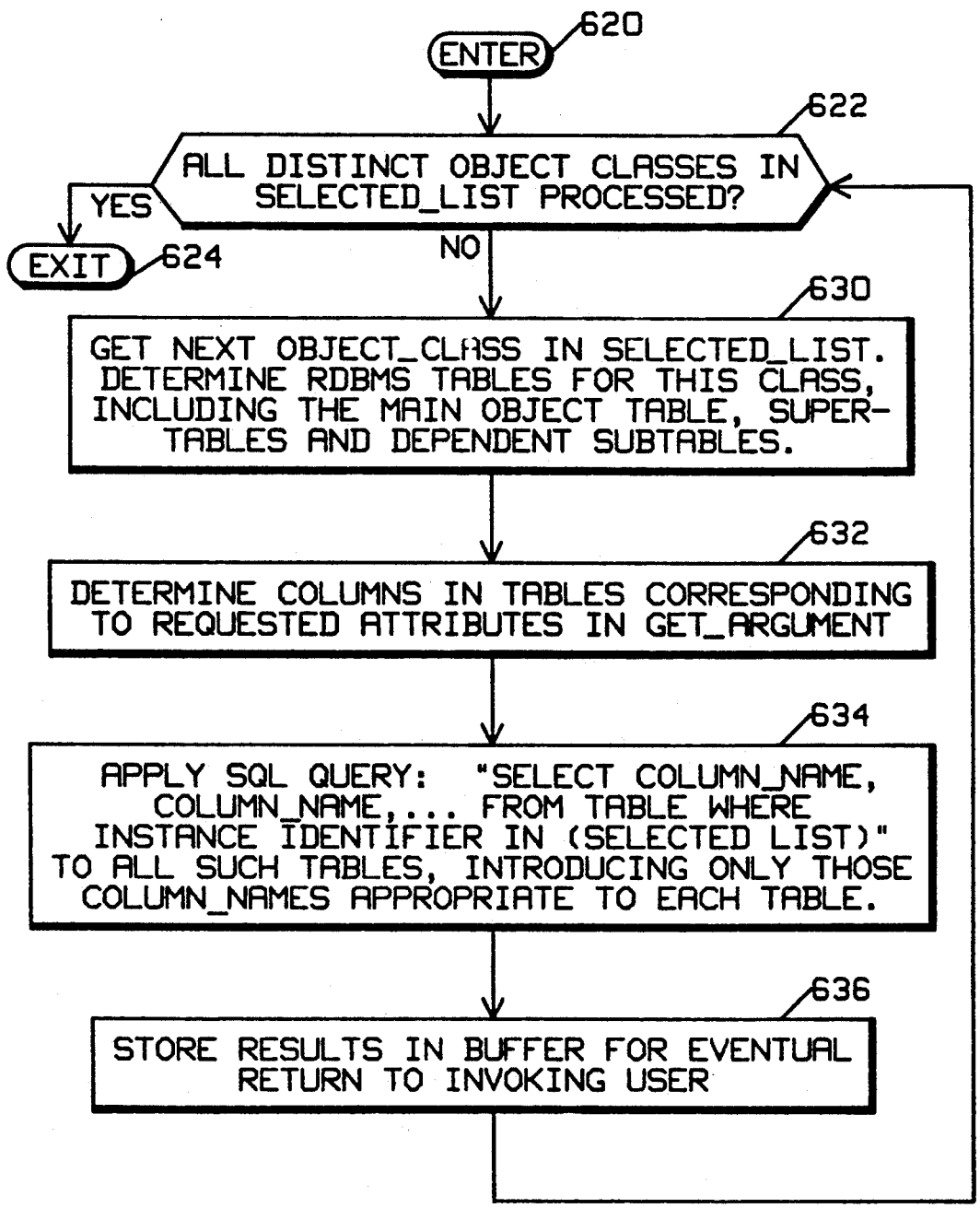
FIG. 16 is a flow chart of the processing of m-Get requests in the present invention.

The processing of the m-Get request at 614 is shown in FIG. 16 starting at step 620. For an m-Get operation, a number of SQL SELECT FROM commands need to be executed. This is done by looping around the set of object class tables resulting from the scoping and filtering operation. Step 622 determines when the looping ends and the routine exits at 624. If all distinct object classes have not been processed at 622, the next object class is obtained and the RDBMS tables are determined at step 630. Step 632 determines which columns in the tables correspond to the requested attributes. An appropriate SQL query is applied at 634 and the results are stored in a buffer at 636. Control then returns to 622.

This process can be described by the following pseudocode:

For each distinct object class for the object instances in the Selected_List:

Determine the main object class table in the MIB schema associated with the current object class. Determine also the object class tables for all associated superclasses for the current object class. Further, determine all dependent subtables which are linked to the main object class table by virtue of normalization on group attributes, conditional packages, unspecified-size set-valued attributes, etc.

For each such selected table:
Create the following SQL command in a text buffer:
SELECT column_name, column_name ... FROM table WHERE instance_identifier IN (Selected_List)
in which the list of column_names contains the column_names corresponding to the attributes specified in the attributeIdList component of the GetArgument, but only those appropriate to the current table. The Selected_List is the set of instance identifiers which is the result of both scoping and filtering.

Pass the command onto the SQL RDBMS for immediate or subsequent execution.

Go to the next table

Note that the above procedure will be modified if a join can be created for all tables related to the same main object class, including joins into the superclass tables and into dependent subtables. In this case, the SQL SELECT query may be across the join, and not necessarily across individual tables. Alternatively, if a view has been predefined in the database effecting all these joins, the SELECT need only query the view. In addition, if Class Hierarchy Flattening has been used to directly store inherited attributes along with the tables for instantiated subclasses, only the main object class table for the current class and its dependent tables need be queried. If some set-valued attributes have been normalized into separate dependent subtables, they must be either queried individually or be made part of the join.

Go to the next object class.

Processing of CMIP m-Set Operations

Figure 17:
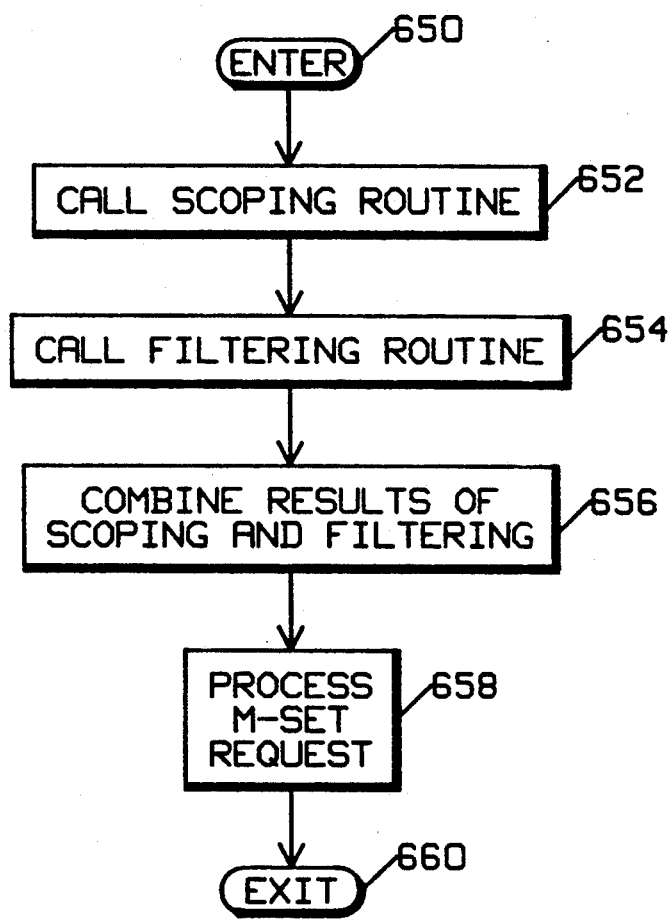
FIG. 17 is a flow chart of the m-Set handler process in the present invention.

The m-Set operation 116 is described in conjunction with FIG. 17 starting at step 650. As with the previous two operations, scoping and filtering is done and then combined in steps 652, 654 and 656 respectively. The m-Set request is processed at 658 and the routine exits at 660.

Figure 18:
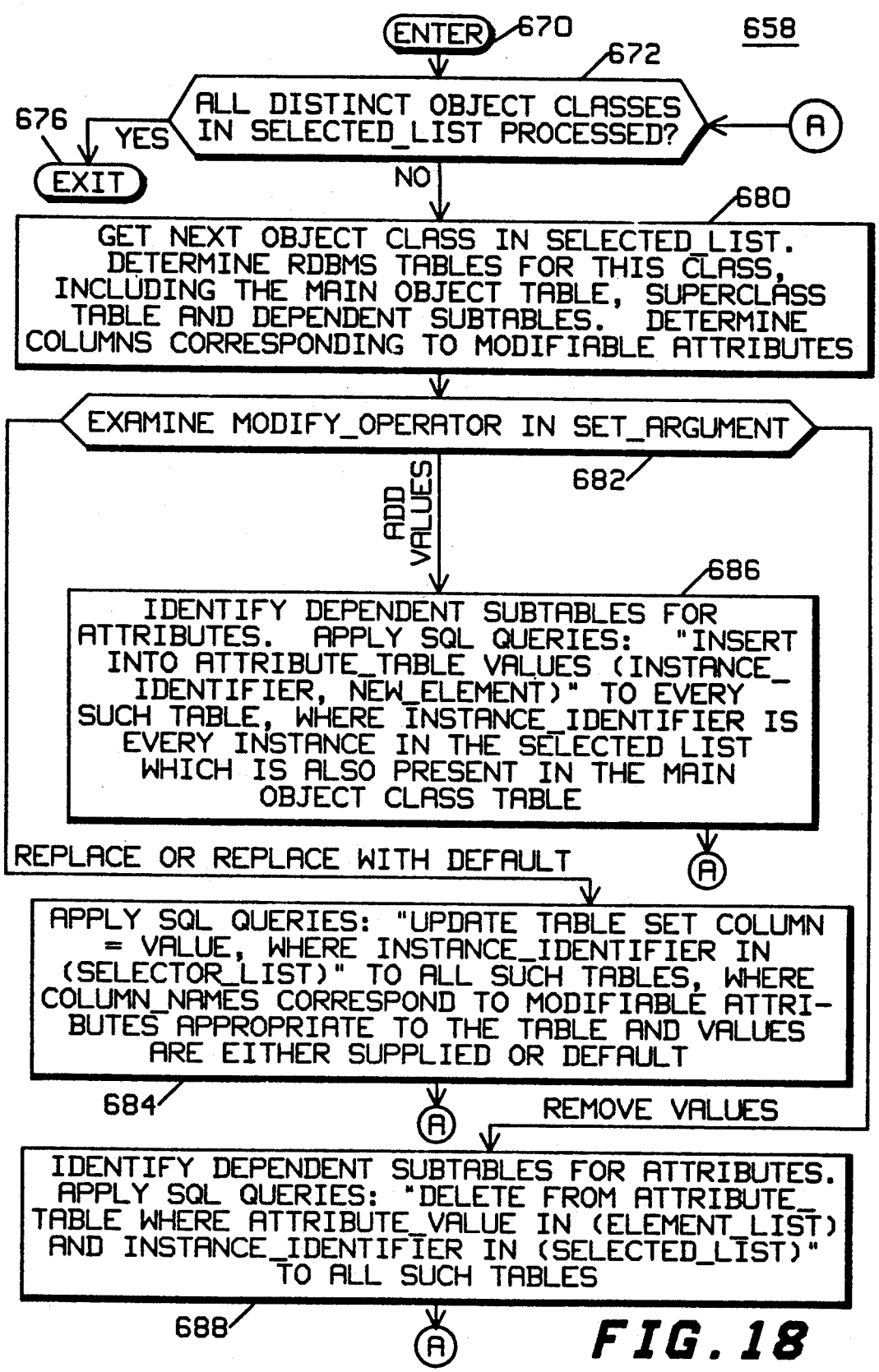
FIG. 18 is a flow chart of the processing of m-Set requests in the present invention.

The details of processing the m-Set request are shown in FIG. 18 starting at step 670. For an m-Set operation, a number of SQL UPDATE commands need to be executed. This is done by looping around the set of object class tables resulting from the scoping and filtering operation. Step 672 determines when the routine exits at 676 by determining when all distinct object classes have been processed. Step 680 determines which RDBMS tables are appropriate step 682 examines the modify operator. Depending upon the modify operator, an appropriate SQL query is generated at step 684, 686 or 688 prior to returning control to 672.

This process can be described by the following pseudocode:

For each distinct object class for the object instances in the Selected_List:

Determine the main object class table in the MIB schema associated with the current object class. Determine also the object class tables for all associated superclasses for the current object class. Further, determine all dependent subtables which are linked to the main object class table by virtue of normalization on group attributes, conditional packages, unspecified-size set-valued attributes, etc.

For each such selected table, examine each element in the modificationList component. If the attributeId specified in the modificationList component of the SetArgument is applicable to the table (that is, the table possesses a column corresponding to that attribute), then an action is warranted on the table as a consequence of the SET request. This action is taken as follows:

If the modifyOperator component of the SetArgument is 0 (replace), not specified (replace), or 3 (set-to-default): create the following SQL command in a text buffer:

UPDATE table SET column_name=value, column_name=value, ... WHERE instance_identifier IN (Selected_List)
in which the list of column_names contains the column_names corresponding to the attributes specified in the attributeId component of the modificationList which have a modifyOperator component of 0 or 3, but only those appropriate to the current table. The list of values corresponds to the values supplied in the attributeValue component of the modificationList (if the modifyOperator is 0), or the default value for that attribute which the translator 75 already knows or can determine from its knowledge of the schema (if the modifyOperator is 3). The Selected_List is the set of instance identifiers which is the result of both scoping and filtering. If the modifyOperator is 3 and no default values can be determined, the routine returns an error.

Pass the commands onto the SQL RDBMS for immediate or subsequent execution.

If the modifyOperator is 1 (add values): new values are to be added to a set-valued attribute. If the set-valued attribute is of specified size and has direct columns which are members of the main object class table, this is treated as a regular UPDATE exactly as above, with the new values being added in the columns which were previously NULL. If the attribute is of unspecified size and has been isolated in its own table for reasons of normalization, and the attribute is appropriate for the current table's object class, then for each new added value element, and each instance_identifier in the Selected_List, determine whether the object instance already possesses the attributeValueElement as a member of its set-valued attribute. If not, construct the following SQL commands in a text buffer:

INSERT INTO attribute_table VALUES (instance_identifier, attributeValueElement)
in which the instance_identifier is every instance selected in the scoped and filtered output which is present the current main object class table, and the attributeValueElements are the ones specified as the elements of the set-valued attribute.

If the modifyOperator is 2, (remove values): values are to be removed from a set-valued attribute. If the set-valued attribute is of specified size and has direct columns which are members of the main object class table, this is treated as a regular UPDATE exactly as above, with the new values being set to NULL for attributes which previously had values. If the attribute is of unspecified size and has been isolated in its own table for reasons of normalization, and the attribute is appropriate to the current table's object class, then construct the following SQL command in a text buffer:

DELETE FROM attribute_table WHERE attribute_value IN (attributeValueElementList) AND instance_identifier IN (Selected_List)

in which the attributeValueElementList are the values specified as the elements of the set-valued asserted attribute, which are required to be removed. The Selected_List is the set of instance identifiers which is the result of both scoping and filtering.

Pass the commands onto the SQL RDBMS for immediate or subsequent execution.

Go to the next table

Go to the next object class

Processing of CMIP m-Create Operations

Figure 19A:
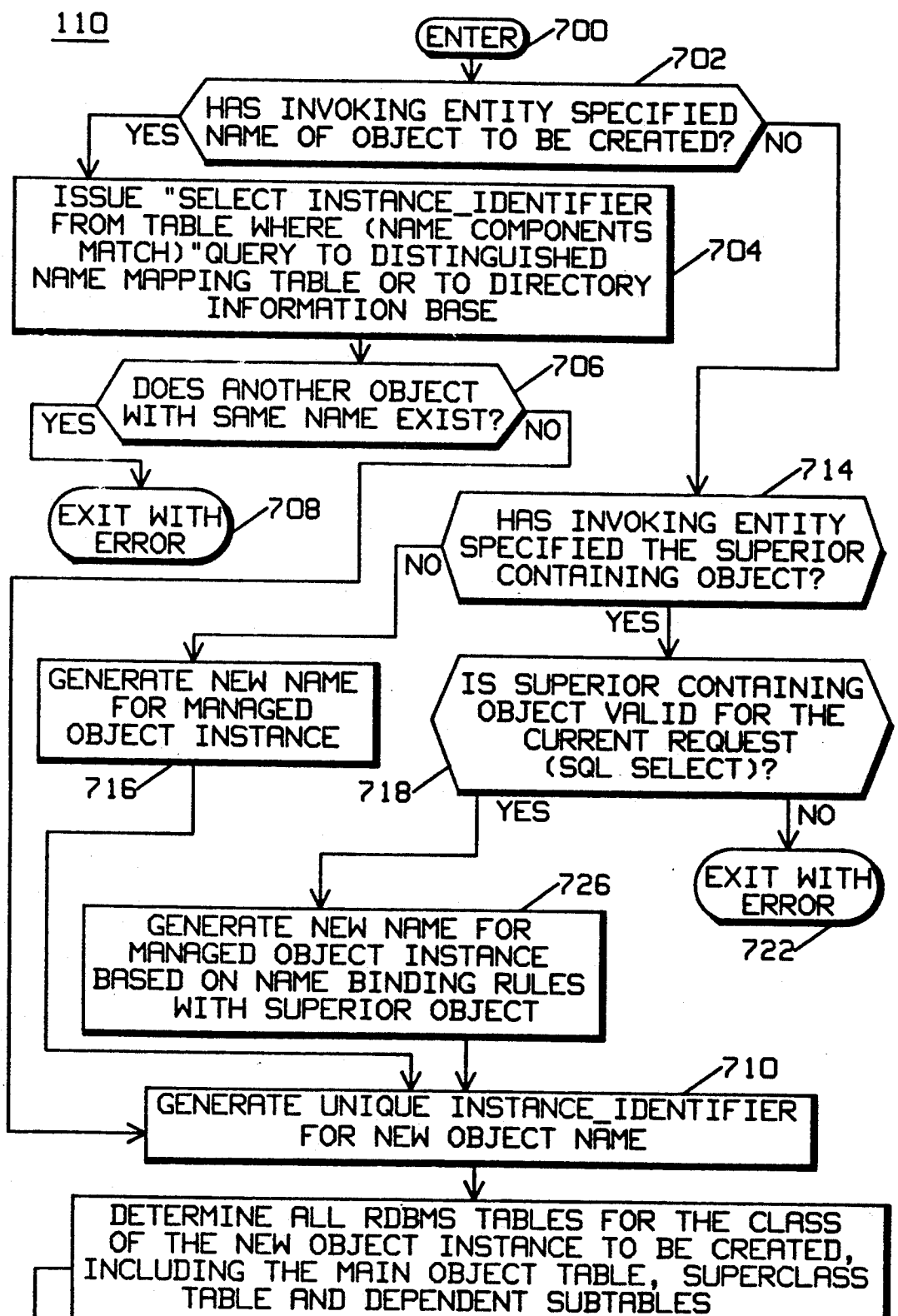
FIGS. 19A through 19C are flow charts of the m-Create handler process in the present invention.
Figure 19B:
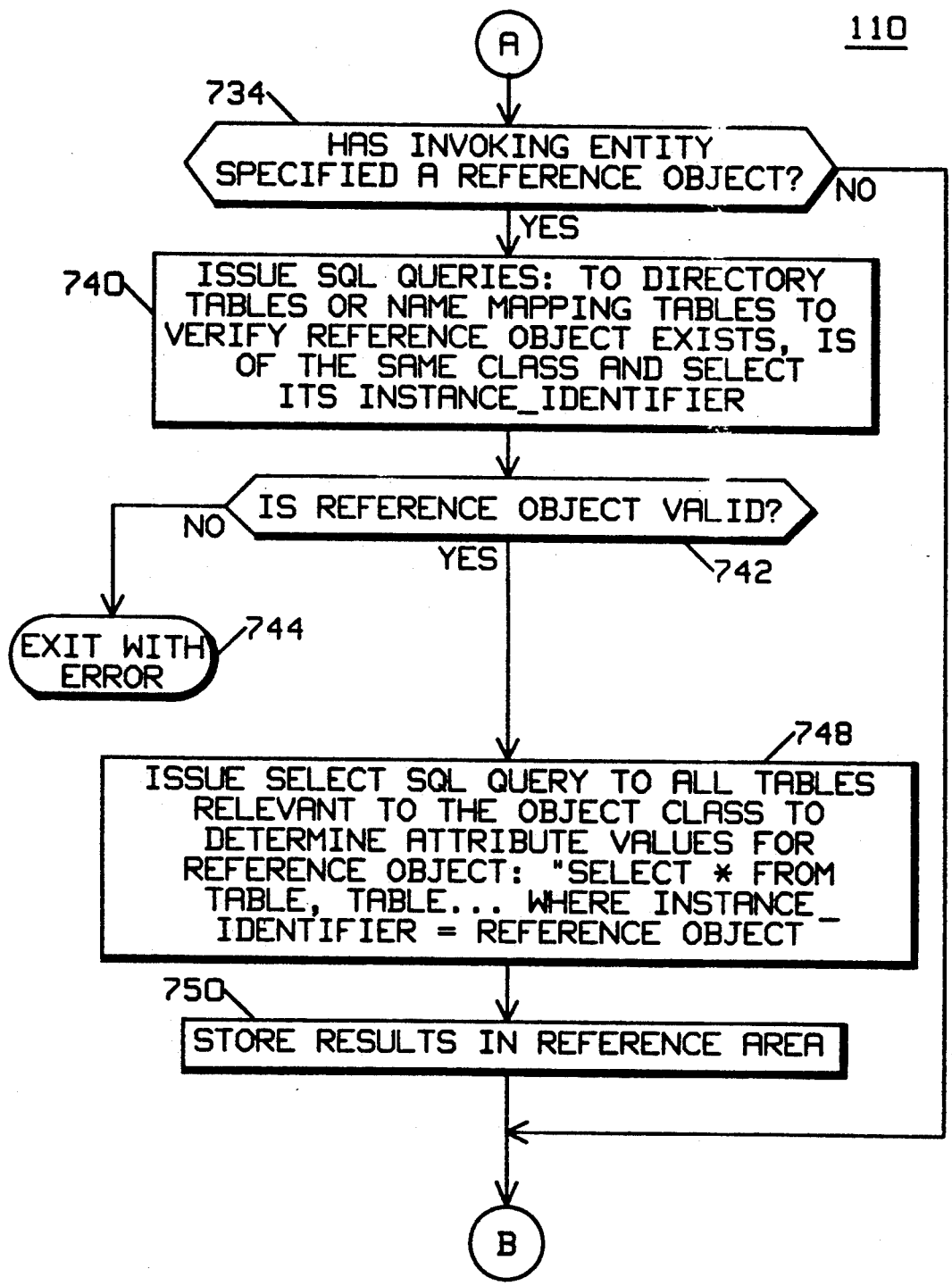
Figure 19C:
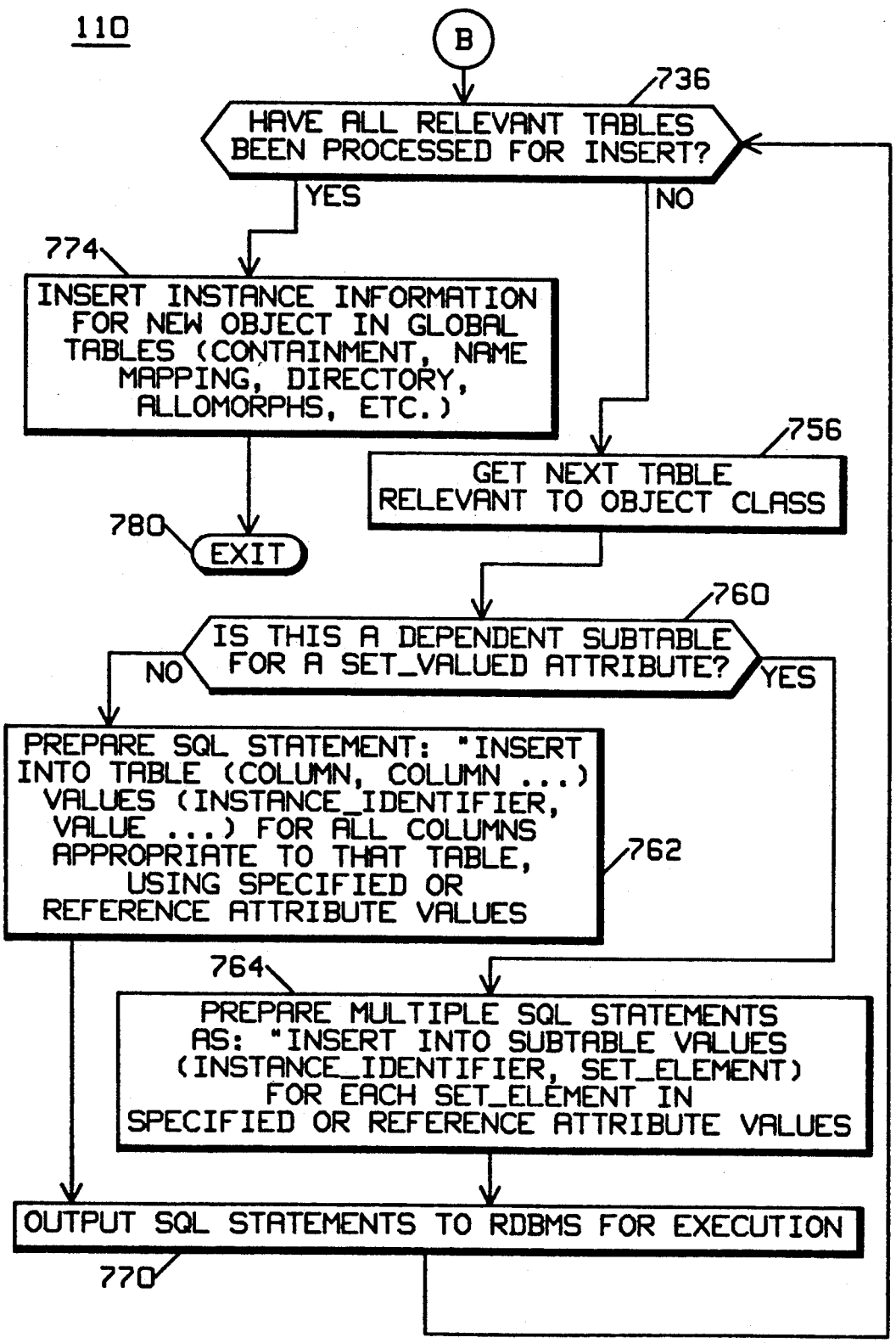

The m-Create operation is described by FIG. 19. For an m-Create operation, no scoping of filtering is required, as only one object instance is specified at a time in the m-Create request for creation within the MIB. On receipt of an m-Create request, the translator 75 invokes the process of FIG. 19 starting at step 700. The process first determines if a name has been specified for the object to be created at step 702. If so, a the instance identifier is selected from the distinguished name mapping table or the directory information base at step 704. Step 706 then checks to see if this is a duplicate name. If so, the routine exits at step 708 with an error. If the name is unique at 706, control passes to 710 where a unique instance identifier is generated for the new object name.

In the event no name was specified at 702, the routine checks to see if the superior containing object was specified at step 714. If not, a new name is generated for the managed object instance at 716 and control then flows to 710. If so, step 718 checks the validity of the superior containing object. In the event the object is invalid, the routine exits with error at 722. Otherwise, a new name is generated at 726 and control again flows to 710.

Step 730 determines all RDBMS tables for the class of the new object instance. The routine then determines if the invoking entity has specified a reference object at 734. If not, control passes to the main loop of the routine, with step 736 serving as an entry point. If a reference object is specified at 734, step 740 issues SQL queries to verify that the reference object exists, is of proper class and to select its instance identifier. If the reference object is not valid at 742, the routine exits at 744 with an error. Otherwise, step 748 issues an SQL query to determine attribute values. The results of the query are stored in the reference area at 750 and the main loop is entered at 736.

Step 736 serves to determine when all relevant tables have been processed. If they have not yet been processed, the next table relevant to the object class is retrieved at step 756. Step 760 determines if the current table is a dependent sub-table for a set valued attribute. If not, step 762 prepares SQL statements insert columns into the table. If so, step 764 prepares multiple SQL statements to insert values into the sub-table. In either event, control then passes to step 770 where the SQL statements are passed to the RDBMS for execution prior to returning to step 736. When step 736 detects that all tables have been processed, step 774 inserts instance information for the new object in the global tables. The routine then exits normally at step 780.

This process can also be described by the following pseudocode:

Determine the class of the managed object to be created from the CreateArgument.

Identify the main object class table corresponding to the managed object class.

Determine whether the requestor has specified the name (a set of Attribute Value Assertions) for the managed object instance to be created. If so, determine whether such an object already exists with the given name, by querying the Distinguished Name Mapping table, or by directly querying the main object class table. This is achieved by means of a simple SQL SELECT statement, such as the following:

SELECT instance_identifier FROM DNMap WHERE (DNComponent1 = . . . ) AND (DNComponent2 = . . . ) AND . . .

where the placeholders in the predicates will be substituted by the Distinguished Name components of the specified object instance. Alternatively, if the Directory (ref. CCITT Standard X.500) has been implemented, the Directory may be queried.

If an object with such a name already exists, return an error; if an object with such a name does not exist, then store the name in a special buffer for subsequent assembly as part of an INSERT statement.

If the requestor has not specified a name for the new managed object instance, determine whether the optional superior managed object instance has been supplied. If it has, and the superior object instance is valid, generate a new name for the managed object instance to be created, based on the NAME BINDING rules for this particular superior/subordinate class pair. Ensure that this generated name does not conflict with existing names of object instances already contained within that superior managed object instance. This can be ensured by querying the Containment tables. Generate a local numeric instance_identifier representation of the Distinguished Name as appropriate to the local database format.

If the requestor has not specified a name for the new managed object instance and has not specified the optional superior object instance, generate a new name for the managed object instance to be created. Ensure that this name does not conflict with names of existing managed object instances of the same class. This can be ensured by querying the main object class table or the Distinguished Name Mapping table, using a SELECT statement similar to the one described above. Generate a local numeric instance_identifier representation of the Distinguished Name as appropriate to the local database format.

In either case, the details of the name generation mechanism are not important to the current invention; such a mechanism may be easily implemented by any one of many existing algorithms.

If the requestor has supplied a reference object, determine that the reference object exists, and is a member of the same object class as the new object to be created. This is achieved by a SELECT statement similar to the above. If the reference object is found to be in error or inapplicable, return an error. If it is found to be valid, retrieve all attributes of the reference object by internally performing the equivalent of an m-Get operation for the reference object. As specified in the details of the m-Get processing, this will result in a number of SQL SELECT statements being generated. The attributes of the reference object are stored in a special area in memory for subsequent assembly as part of an INSERT statement.

Determine the set of all tables (superclass tables, dependent subtables) associated with the object table.

For each such table,

Determine the set of attributes for the object class of the new object, which are pertinent to this table (that is, the table possesses a column corresponding to the value of this attribute).

Determine whether a value was specified for the attribute in the CreateArgument. If not, determine whether a value was specified for the attribute in the reference object, which is accessible from the area in memory where it was stored. If not, determine whether a default value is available for this attribute based on the knowledge of the object class specification and the knowledge of the database schema, possibly using a SELECT statement. If not, determine whether the attribute is a mandatory attribute. If the attribute is mandatory and no value can be determined, return an error. If a value can be determined, ensure that the value is legal based on the knowledge of the object class specification and the knowledge of legal attribute values stored in the database schema. If the value is not legal, return an error. If it is legal, prepare the following SQL statement:

INSERT INTO table (column_name, column_name ... VALUES (value1, value2, ... )

where the column_names are the columns corresponding to attributes which are valid for this table, and value1, value2 etc are the corresponding values for those attributes, converted into appropriate textual representation for legal SQL syntax.

If the column_name is the instance identifier for the object, the generated instance identifier may be used. If the attribute is not a mandatory attribute and no value can be determined, a NULL is inserted.

Note that, if the table currently being processed is a dependent subtable which has been isolated for normalization of a conditional package, attribute group or set-valued attribute, multiple INSERT statement will be required, one for each element of the set:

INSERT INTO subtable (instance_identifier, value)
VALUES (current_object_instance_identifier, attributeSetElement)

If the attributeSetElement in the subtable is a member of a sequence-valued attribute of unspecified size, an additional column must be inserted which is the sequence index, to indicate the position of the element in the sequence, which is significant.

Go to the next table.

Once all tables corresponding to the object have been processed, entries need to be made in global tables to record the existence of the object. These may include the Distinguished Name mapping table, the Containment tables, Allomorphic Superclass tables, and any other Directory information which the system stores. These are also accomplished using the following:

INSERT INTO tcontainment (ContainingClass, ContainingInstance, ContainedClass, ContainedInstance) VALUES (superiorObjectClass, superiorobjectinstance, currentObjectClass, currentObjectInstance)

If the information for the superior containing object was not supplied in the m-Create request, NULLs may be inserted.

INSERT INTO DNMap (DNComponent1, DNComponent2, ... instance_identifier) VALUES (currentObjectDNComponent1, currentObjectDNComponent2, ... instance_identifier)

where the DN Component values for the current object were generated if they were not supplied with the request, and the instance_identifier was uniquely generated to correspond to the DN Component values.

Once all required INSERT statements are executed by the RDBMS without error, a COMMIT may be issued to commit the changes to the RDBMS, and a success indication may be returned.

Processing for an m-EventReport Operation

The processing of m-EventReport operations is described in connection with FIG. 20. The process is entered at step 800. At step 804 a new instance identifier is generated for the event report. Then, at 806, an SQL statement is issued to the distinguished name mapping table to find the appropriate instance identifier. Depending on the event report type at 810, the routine determines all the relevant tables and sub-tables. Then the main loop of the routine is entered at 812.

An m-EventReport operation is processed by the translator 75 as a set of SQL INSERT statements into the tables that constitute the event log. It is assumed that, at the point it has been received by the translator 75, the event has already been cleared for introduction into the MIB. This implies that the event has passed all forwarding discriminators and other filtering mechanisms which are in effect in the executing system. It is assumed that the system has been designed in a manner that, should an event not pass the criteria imposed by these mechanisms, it will not arrive as input to the translator 75 for introduction into the MIB.

Step 812 checks to see if all tables have been processed yet. If not, the next relevant table is retrieved at 816 and step 820 determines if this is a dependent subtable for a set valued attribute. If not an SQL statement is prepared at 824 to insert the values into the table constituting the event log. If so, multiple insert statements are prepared for each set element in the attribute at step 830. In either event, step 832 presents the resulting SQL queries to the RDBMS for execution and control returns to step 812 to determine if the last table has been processed. When the last table is processed, step 836 updates the global information as required and the routine exits normally at 838.

The MIB implementation, following the description provided in above incorporated patent application, is assumed to contain data tables similar to the following, or equivalents thereof:

LOG RECORD TABLE

| instance_id | logRecordID | loggingTime |
|---|---|---|
|  |  |  |
|  |  |  |

EVENT LOG RECORD TABLE

| instance_id | managedObjectClass | managedObjectInstance | Event Time |
|---|---|---|---|
|  |  |  |  |
|  |  |  |  | where, as explained in (earlier patent application), the Event Log Record objects, being subclasses of Log Record objects, also have some of their information stored in the general Log Record table by virtue of table normalization over the inheritance relationship. The instance identifier column, containing the same value in both the tables for the same event, serves as the join column for reconstructing attributes of the entire event.

Further subclasses could be derived from the Event Log Record class, and these would have table structures similar to the following, or equivalent:

OBJECT NAME CHANGE RECORD TABLE

| instance_id | newName | sourceIndicator | additionalNameChangeInfo |
|---|---|---|---|
|  |  |  |  |
|  |  |  |  |

OBJECT CREATION RECORD

| instance_id | sourceIndicator | additionalCreateInfo |
|---|---|---|
|  |  |  |
|  |  |  |

OBJECT DELETION RECORD

| instance_id | sourceIndicator | additionalDeleteInfo |
|---|---|---|
|  |  |  |
|  |  |  | and so on. Many such event records have been defined by OSI (CCITT X.721) which are derived from the EventRecord managed object class; in the relational MIB, they are assumed to have table representations similar to the descriptions above, or equivalent.

The exact layout of the tables is not important for the current translator 75, as long as the translator 75 is able to determine what the layout is from the schema, so that it may use that knowledge to formulate its queries. The important aspect here is the ability of the translator 75 to formulate SQL statements for inserting data into the MIB 50, once a processed m-EventReport PDU is passed on to it for MIB action.

Once an m-EventReport operation is received by the translator 75, it processes it based on the following method:

Determine from the EventReportArgument the Object Class corresponding to the managed object for which the event was reported. Determine also the Object Instance for the managed object for which the event was reported. Determine from the MIB 50 what the object's local instance_identifier representation is, by performing an SQL SELECT statement on the Distinguished Name mapping table, as described earlier.

Determine from the EventReportArgument the time of the event.

Determine the event type of the event reported. Based on the event type, determine what tables require to have new records inserted in them. (For example, if the event type is Object Name Change event, then the Object Name Change Record table needs to have a record inserted in it). In any case, both the Log Record table and the Event Log Record table always require records to be inserted in them.

Determine the current time, and designate this the logging time.

Generate a new logRecordID value to identify the current logging record.

Generate a new instance_identifier value for the event object to tie all the tables together which will have records inserted in them as a result of the current event report. As a matter of convenience, the instance_identifier may or may not be the same as the logRecordID; such a decision may be made at schema definition time, in which case only one of the two columns instance_identifier and logRecordID will be present in the Log Record table.

Generate the following SQL statements:

```
INSERT INTO logRecordTable (instance_identifier,logRecordID,
loggingTime)
VALUES
    (   generated_event_instance_identifier,
        generated_logRecordID,
        current_time)
INSERT INTO eventLogRecordTable (instance_identifier,
managedObjectClass, managedObjectInstance, eventTime)
VALUES
    (   generated_event_instance_identifier,
        reported_managedObjectClass,
        reported_managed_object_instance_identifier,
```

-continued reported_event_time)

In addition, further INSERT statements may be generated depending on the event type. The exact nature of the event, determined from the eventType component of the EventReportArgument, will determine what tables require additional inserts. The exact contents of the information required to be inserted into these tables can also be determined from the eventInfo component of the EventReportArgument. Based on this information, the translator 75 generates further INSERT SQL statements as necessary.

Once all the INSERT statements have been generated, they may be passed on the RDBMS for execution. A COMMIT may then be issued to commit the new information to the database. If all statements are executed in the RDBMS without error, an indication of success may be returned to the invoking CMISE-service-user.

System Block Diagram

Figure 21:
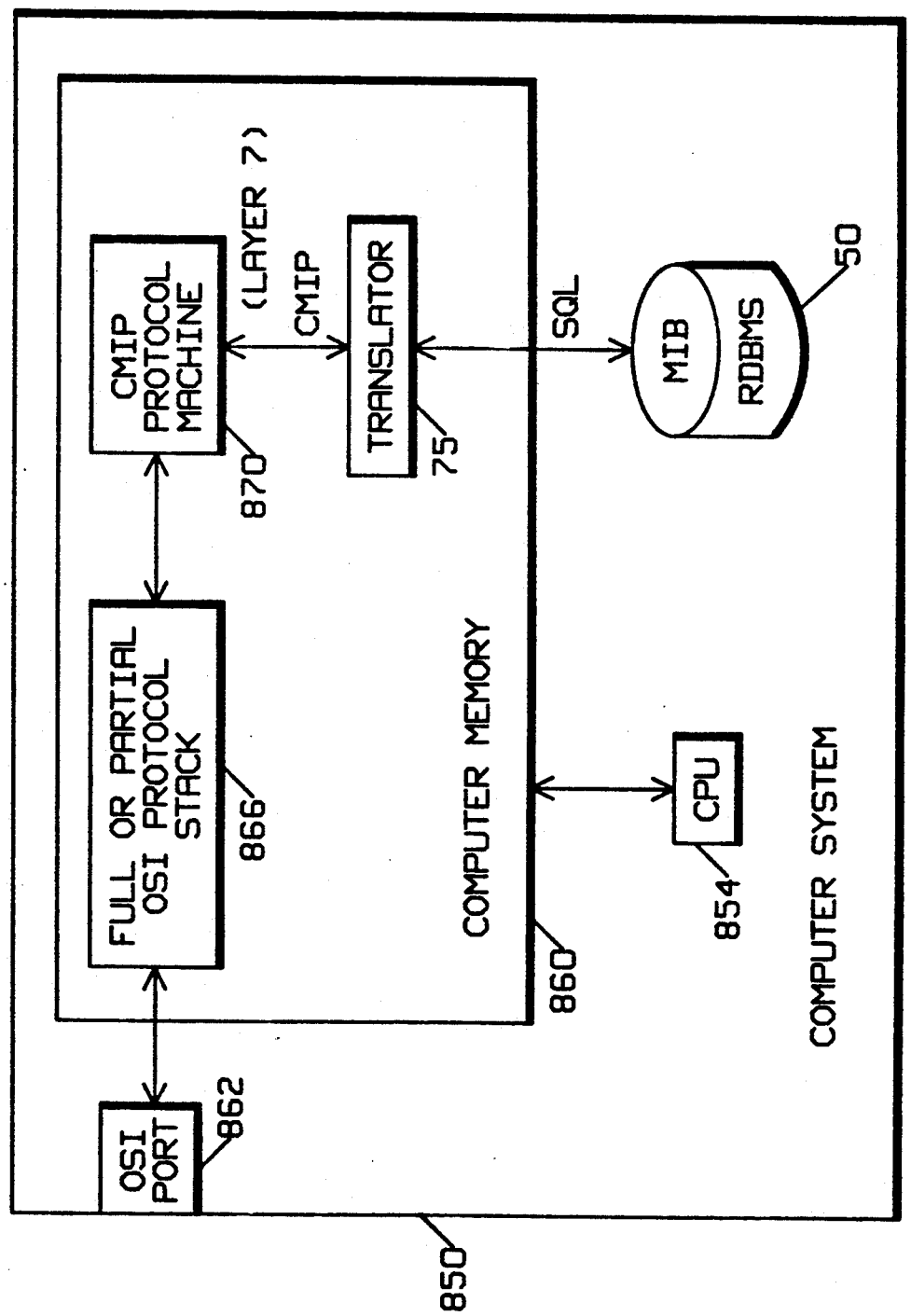
FIG. 21 is a block diagram of a hardware arrangement for implementing the present invention.

A minimal translator system according to the preferred embodiment is shown in FIG. 21 residing on a computer system 850 having a Central Processing Unit (CPU) 854, a disk drive or other persistent storage containing an RDBMS hosting a MIB 50, and a computer memory 860. An OSI port 862 communicates with a full or partial OSI protocol stack 866 which in turn communicates with a CMIP protocol machine 870 (layer 7). Translator 75 receives CMIP from 870 and performs the appropriate translations to SQL for communication with RDBMS 50.

Optimizations

As a matter of efficiency, the outer and inner loops described in the section on preprocessing of scoped and filtered output for m-Get, m-Set and m-Delete operations, may be combines with the outer and inner loops described in the actual processing for those operations. This implies that no intermediate Selected_List is generated and stored for later action, rather, the m-Set, m-Get and m-Delete operations are immediately invoked as soon as each object instance is returned as the result of scoping and filtering. This is a minor variation for the sake of efficiency and does not alter the essence of the process.

In all cases, either the translator 75 itself, or some other software module designated for the purpose of validating successful execution of RDBMS transactions, must ensure the correct execution of all SQL statements generated by the translator 75. Should any of these statements result in an error following the RDBMS transaction, an appropriate error indication is returned to the invoking CMISE-service-user. This error is formulated as one of the pre-specified ERROR codes in the appropriate ROS operation.

Many variations of the present invention will occur to those skilled in the art. For example, there can be several database management systems operating in conjunction with the present invention which collectively contain the MIB. The database management system may by local or remote, centralized or distributed. The invention could be implemented as part of a network management system. It can reside on a workstation, a single computer or in a distributed processing environment on a network of computers which collectively perform the network management functions. The database query language may deviate from standard SQL and or the present invention may be adapted to operate with other database query languages as required. The database may, in some circumstances, not be relational but may accept commands in SQL or in some variant of SQL. The network management protocol describing the network management operation may vary from the preferred CMIP. All resources shown in FIG. 21 need not be coresident on the same computer system, but may be distributed resources on a local or wide area network. Other variations will occur to those skilled in the art.

Thus it is apparent that in accordance with the present invention, an apparatus that fully satisfies the objectives, aims and advantages is set forth above. While the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the scope of the appended claims.

What is claimed is:

1. A method for translating Common Management Information Protocol (CMIP) network management operations using a digital computer, comprising in combination the steps of:

retrieving a network management operation and argument from a network management processing machine;

ascertaining if said network management operation comprises one m-Create, m-Delete, m-Set, m-Get and m-Event Report CMIP operations;

translating said ascertained CMIP operation into a database query, said database query being a Structured Query Language (SQL) query; and executing said database query with respect to a relational database.

2. The method of claim 1, wherein said translating step generates said database query based upon the CMIP operation in accordance with the following:

| CMIP Operation | SQL Query |
| --- | --- |
| m-Create | INSERT INTO (table_name) ... |
| m-Delete | DELETE FROM (table_name) WHERE ... |
| m-Get | SELECT FROM (table_name) WHERE ... |
| m-Set | UPDATE (table_name) SET ... |
| m-EventReport | INSERT INTO (table_name) ... | where (table_name) represents a name of a database table on which the SQL query is to be performed.

3. The method of claim 1, further comprising the step of ascertaining whether or not said network management operation is of a type which interfaces with said relational database.

4. The method of claim 1, further comprising processing said network management operation on an Open System Interconnection (OSI) protocol stack.

5. The method of claim 4, wherein said OSI protocol stack is a full OSI protocol stack having all layers present.

6. The method of claim 4, wherein said OSI protocol stack is a partial OSI protocol stack having at least one layer missing.

7. The method of claim 1, further comprising processing said network management operation on a protocol stack which is not an Open System Interconnection (OSI) protocol stack.

8. The method of claim 1, wherein said generating step includes joining a plurality of database tables and creating a query that spans said joined tables.

9. The method of claim 1, wherein said generating step generates a query against a view of a plurality of database tables.

10. The method of claim 1, further comprising the step of executing said database query against said database.

11. The method of claim 1, further comprising the steps of:
   obtaining a result from said executed step;
   analyzing said result to determine if further database queries are required to satisfy said network management operation; and
   if said analyzing step requires an additional database query, issuing said additional database query.

12. An apparatus for translating a Common Management Information Protocol (CMIP) network management operation into a database query, comprising:
   a database containing information relevant to said network management operation;
   receiving means for receiving said network management operation;
   decoding and analyzing means for determining if said network management operation is one of m-Create, m-Delete, m-Set, m-Get and m-Event Report CMIP operations;
   translating means for for converting said decoded CMIP operation to a Structured Query Language (SQL) database query corresponding to the ascertained type of said CMIP operation; and
   means for executing said database query in a relational database.

13. The apparatus of claim 12, wherein said decoding means comprises a full or partial Open System Interconnection (OSI) protocol stack.

14. The apparatus of claim 12, wherein said analyzing means comprises a CMIP protocol machine.

15. An apparatus for translating a Common Management Information Protocol (CMIP) network management operation into a database query, comprising:
   a relational database containing information relevant to said network management operation, said relational database being compatible with Structured Query Language (SQL) queries,
   an Open System Interconnection (OSI) interface for receiving said CMIP network management operation;
   an OSI protocol stack for decoding said network management operation;
   a CMIP protocol machine for analyzing said decoded network management operation to determine if said decoded network management operation requires interaction with said database;
   translating means for converting said decoded and analyzed network management operation into a SQL database query.

* * * * *